(12) United States Patent
Dong et al.

(10) Patent No.: US 11,639,460 B1
(45) Date of Patent: May 2, 2023

(54) NANOMETER SELF-LOCKING BENTONITE FILM-FORMING AGENT, METHOD FOR PREPARING THE SAME, AND FILM-FORMING DRILLING FLUID

(71) Applicants: Southwest Petroleum University, Chengdu (CN); Chongqing University, Chongqing (CN); Sichuan Xinlin New Material Technology Co., Ltd, Zigong (CN)

(72) Inventors: Wenxin Dong, Chongqing (CN); Xiaolin Pu, Chengdu (CN); Jinyang Fan, Chongqing (CN); Wenhao Liu, Chongqing (CN); Siyi Chen, Chongqing (CN); Hanyi Wang, Chongqing (CN); Deyi Jiang, Chongqing (CN); Yi Cao, Chongqing (CN); Jianjun Chen, Chongqing (CN); Yao Ge, Chongqing (CN); Jinsheng Sun, Chengdu (CN); Wei Chen, Chengdu (CN); Tao Han, Chongqing (CN); Jingwen Xiao, Chengdu (CN)

(73) Assignees: Southwest Petroleum University, Chengdu (CN); Chongqing University, Chongqing (CN); Sichuan Xinlin New Material Technology Co., Ltd., Zigong (CN)

(*) Notice: Subject to any disclaimer, the term of this patent is extended or adjusted under 35 U.S.C. 154(b) by 0 days.

(21) Appl. No.: 17/866,046

(22) Filed: Jul. 15, 2022

Related U.S. Application Data

(63) Continuation of application No. PCT/CN2022/099208, filed on Jun. 16, 2022.

(30) Foreign Application Priority Data

Apr. 20, 2022 (CN) .................. 202210419535.7

(51) Int. Cl.
*C09K 8/14* (2006.01)
*C09K 8/035* (2006.01)
*C08J 5/18* (2006.01)

(52) U.S. Cl.
CPC ............. *C09K 8/145* (2013.01); *C08J 5/18* (2013.01); *C09K 8/035* (2013.01); *C09K 2208/10* (2013.01)

(58) Field of Classification Search
None
See application file for complete search history.

(56) References Cited

U.S. PATENT DOCUMENTS

| | | | |
|---|---|---|---|
| 10,370,587 B2 * | 8/2019 | Borrell | E21B 49/08 |
| 10,647,903 B2 * | 5/2020 | Mohammed | C09K 8/36 |
| 10,829,679 B1 * | 11/2020 | Bai | C09K 8/16 |
| 11,162,010 B2 * | 11/2021 | Bai | C09K 8/035 |
| 2018/0155597 A1 * | 6/2018 | Burns | C09K 8/03 |
| 2018/0298277 A1 * | 10/2018 | Borrell | E21B 47/11 |

\* cited by examiner

*Primary Examiner* — John J Figueroa
(74) *Attorney, Agent, or Firm* — Volpe Koenig

(57) ABSTRACT

The present application discloses a nanometer self-locking bentonite film-forming agent, a method for preparing the same, and a film-forming drilling fluid.

11 Claims, 9 Drawing Sheets

NANOMETER SELF-LOCKING BENTONITE FILM-FORMING AGENT, METHOD FOR PREPARING THE SAME, AND FILM-FORMING DRILLING FLUID

CROSS REFERENCE TO RELATED APPLICATIONS

The application is a continuation application of International Patent Application No. PCT/CN2022/099208, filed on Jun. 16, 2022, which claims priority to Chinese Application No. 202210419535.7, filed on Apr. 20, 2022, entitled "Nanometer Self-Locking Bentonite Film-Forming Agent, Method for Preparing the Same, and Film-Forming Drilling Fluid", which are incorporated herein by reference as if fully set forth.

FIELD

The present disclosure relates to the technical field of novel functional materials, in particular to a nanometer self-locking bentonite film-forming agent, a method for preparing the same, and a film-forming drilling fluid.

BACKGROUND

With the development of conventional oil and gas reservoirs all over the world which is gradually exhausted, the people have to step up efforts for the exploration and development of unconventional shale oil and gas. However, because of the different depositional environment and geological formation, most of the drilled shale oil and gas reservoirs are muddy-type water-sensitive shale (including a bentonite laminated structure), the shale structure is prone to collapse upon contact with water. The main reason is that the contact of water with the shale reservoir stratum is not effectively suppressed during a process of drilling a shale oil and gas formation by using a water-based drilling fluid, resulting in damage and destabilization of the shale structure. The serious condition even cause severe engineering accidents such as wellbore collapse, reservoir stratum collapse, local earthquake; the accidents not only increase the cost and risk of well drilling operations, but also cause troubles for the daily lives of the surrounding people, the development of shale oil and gas exploration has been restrained and hindered to some extent in recent years.

Presently, there are three major technical approaches to preventing the hydration and collapse of shale in China and foreign countries, namely reducing water activity, inhibiting clay hydration and blocking water transfer. Although many effective anti-collapse agents of shale have been developed all over the world, there are still many problems and challenges.

(1) From the perspective of inhibiting shale hydration, the inhibitor aims to suppress the hydration and dispersion of the bentonite, and firstly combine with the bentonite tablet to form surface hydrophobic groups (i.e., to inhibit surface hydration). However, it is difficult for the inhibitor to avoid the contact with the bentonite particles inside the wellbore, thus the inhibitor can hardly effectively enter into an interior of the reservoir, it cannot effectively bind to the clay (a bentonite layered structure) inside the reservoir, an inhibitor which can couple with all active sites of clay has not been developed. Although the domestic and foreign scholars have proposed the production method of a shielding-inhibition type anti-collapse fluid, but its manufacturing cost is high, and the bentonite inside the anti-collapse fluid needs to be preferentially wrapped to prevent it from binding with the inhibitor.

(2) From the viewpoint of blocking the water molecule transmission channels, the blocking agent can effectively fill the shale transmission pore channels and prevent the subsequent water content from accessing inside of the shale reservoir stratum. However, the filling and stacking of the blocking particles take a certain time, and will usually penetrate a part of water before they constitute a valid plugging segment, thereby causing hydration of clay. On the other hand, the blocking agent cannot fill the pores with a smaller pore diameter than itself, the blocking is mainly dependent on its physical properties. In fact, there are a lot of micro-cracks on the shale surface and inside thereof, thus water molecules can still invade and induce the development of cracks.

Film-formation for isolating the shale pores is an effective means. By rapidly forming a film on the shale surface and its internal pores, the isolative extima and intima are rapidly formed at the shale interface and inside the shale through intermolecular interactions and specific layer-membrane structure, so as to fulfill the purpose of completely hydrophobic and blocking water, thereby effectively suppressing the development of micro-cracks within the shale, and effectively securing the structural strength of the shale.

Currently, the researches of using graphene as a main film-forming material have strong film-forming and anti-collapse properties, because graphene has natural layered structural features and is a natural film-forming "fence", but the graphene is cost prohibitive.

Therefore, how to construct an economically viable layer structure to form a film is a significant challenge for current tasks of forming film and preventing collapse.

SUMMARY

The object of the present disclosure is to overcome the problems in the prior art with respect to high temperature failure, instability at high temperatures, failure to effectively prevent collapse of the film-forming agent, and to provide a nanometer self-locking bentonite film-forming agent, a method for preparing the same, and a film-forming drilling fluid; the film-forming agent and film-forming fluid can effectively form film at high temperatures, and form an effective isolation barrier on micro-pores inside and outside the target rock stratum, so as to prevent intrusion of an external moisture into an interior of the rock stratum.

In order to achieve the above object, a first aspect of the present disclosure provides a method for preparing a nanometer self-locking bentonite film-forming agent comprising:

(1) subjecting a nano-bentonite to a first contact with an acid to perform a chemical slicing, so as to obtain a sliced nano-bentonite;

(2) initially subjecting the sliced nano-bentonite to a second contact with an aqueous sodium chloride solution, then subjecting to a third contact with a long-chain macromolecular polymer material, so as to obtain a low-dimensional nanometer self-locking bentonite;

(3) blending the low-dimensional nanometer self-locking bentonite, the nano-bentonite and water, the dropwise adding a structural bonding agent to activate a layer structure surface of the low-dimensional nanometer self-locking bentonite;

(4) introducing trichromethane solution, 2,2'-bipyridine complexing solution, p-xylene solution into the product obtained after step (3) under the protection of nitrogen gas, subsequently adding a N,N,N',N'',N''-pentamethyl-diethylene-triamine crosslinker for carrying out a free reaction under a constant temperature, so as to germinate the layer structure surface of the low-dimensional nanometer self-locking bentonite;

(5) subjecting a reaction solution after step (4) to a washing, centrifugation and drying treatment by using a mixed liquor of trichloromethane and methanol, thereby prepare a nanometer self-locking bentonite film-forming agent.

In a second aspect, the present disclosure provides a nanometer self-locking bentonite film-forming agent prepared with the aforesaid method.

In a third aspect, the present disclosure provides a film-forming drilling fluid comprising an anti-collapse treatment agent and a filtrate reducer, wherein the anti-collapse treatment agent is the aforesaid nanometer self-locking bentonite film-forming agent.

Due to the above technical scheme, the present disclosure produce the following favorable effects:

(1) The present disclosure first prepares and obtains a low-dimensional nanometer self-locking bentonite, which can spontaneously respond to high temperature under the condition of a high temperature of 150° C., and form a dense self-locking nano-membrane structure, which helps to form an anti-collapse intima and prevents intrusion of subsequent moisture into an interior of shale. Engineering feasibility assessment is effectively performed by means of the pressure transfer experiment under high-temperature and high-pressure, the finally prepared nanometer self-locking bentonite film-forming agent may slow pressure transfer and penetration, it is an efficient shale anti-collapse agent. A use of the nanometer self-locking bentonite film-forming agent as the anti-collapse agent can effectively extend pressure transfer time to 63 h, decrease transfer permeability to $2.3 \times 10^{-4}$ mD, and increases pressure start time from 18 h to 41 h with a growth amplitude of 128%, thereby greatly improve shale stability and ensures safe drilling time.

(2) The thermally responsive film-forming drilling fluid has strong inhibition properties with an inhibition rate greater than 80%, and strong salt resistance and temperature resistance, the resistance temperature may reach 150° C., and can form a completely impermeable isolating film, and a dynamic filtrate loss increment simulating high-temperature and high-pressure can verge to zero in a relatively short time, thus the drilling fluid has desirable plugging ability, and can effectively prevent drilling fluid and filtrate from entering the formation, and is more conducive to stabilizing the borehole wall.

(3) Compared with other high performance anti-collapse agent, both the self-locking bentonite and the nanometer self-locking bentonite film-forming agent have excellent shale anti-collapse performance. The high performance inhibitive PEI anti-collapse agent has poor anti-collapse performance under high temperature condition, cannot form a desired membrane structure to prevent the further contact of water molecules with the shale. The experimental results show that the anti-collapse effects of the experimental anti-collapse agents are as follows: nanometer meter self-locking bentonite film-forming agent >nanometer self-locking bentonite >high performance cationic emulsified asphalt composite silica >self-locking bentonite >high performance cationic emulsified asphalt >polyethyleneimine PEI.

(4) The biotoxicity of the thermally responsive film-forming drilling fluid meets the industry recommended discharge standard by the biotoxicity test of photogenic bacterium method, none of the other treatment agents and the film-forming drilling fluid formed thereof exhibits the fluorescence, thereby facilitate the on-site operation.

DESCRIPTION OF REFERENCE SIGNS

Figure 1:
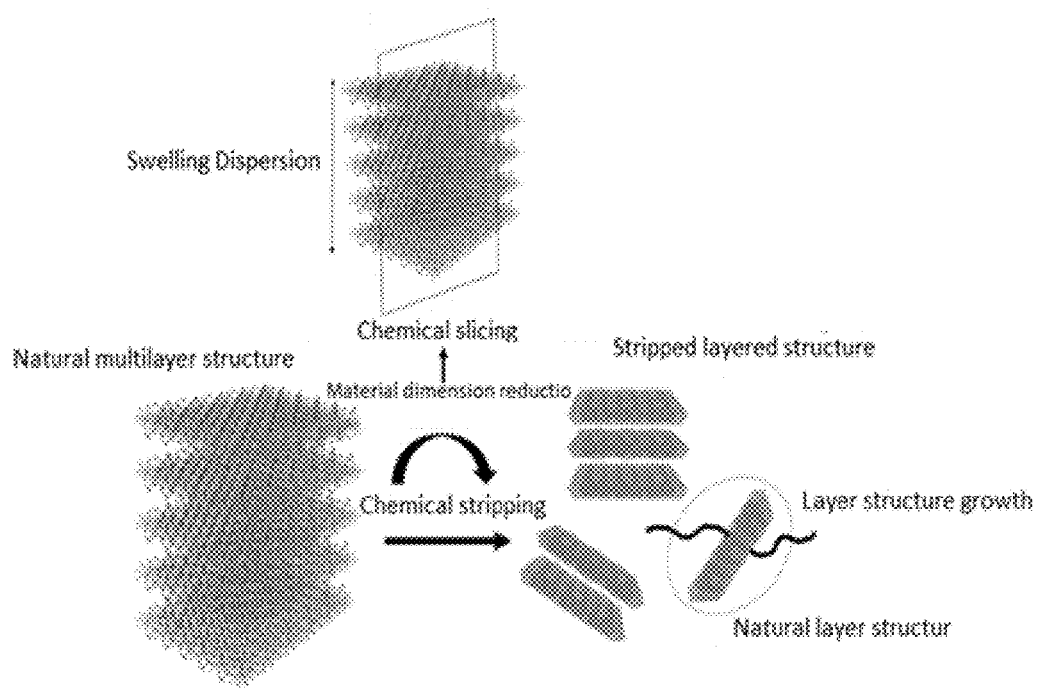
FIG. 1 illustrates a schematic diagram of the method for preparing the low-dimensional nanometer self-locking bentonite of the present disclosure.

Formed film 1#—Comparative Example 1;
Formed film 2#—Comparative Example 2;
Formed film 3#—Example 1.

DETAILED DESCRIPTION

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

As previously mentioned, a first aspect the present disclosure provides a method for preparing a nanometer self-locking bentonite film-forming agent comprising:

(1) subjecting a nano-bentonite to a first contact with an acid to perform a chemical slicing, so as to obtain a sliced nano-bentonite;

(2) initially subjecting the sliced nano-bentonite to a second contact with an aqueous sodium chloride solution, then subjecting to a third contact with a long-chain macromolecular polymer material, so as to obtain a low-dimensional nanometer self-locking bentonite;

(3) blending the low-dimensional nanometer self-locking bentonite, the nano-bentonite and water, the dropwise adding a structural bonding agent to activate a layer structure surface of the low-dimensional nanometer self-locking bentonite;

(4) introducing trichromethane solution, 2,2'-bipyridine complexing solution, p-xylene solution into the product obtained after step (3) under the protection of nitrogen gas, subsequently adding a N,N,N',N'',N''-pentamethyl-diethylene-triamine crosslinker for carrying out a free reaction under a constant temperature, so as to germinate the layer structure surface of the low-dimensional nanometer self-locking bentonite;

(5) subjecting a reaction solution after step (4) to a washing, centrifugation and drying treatment by using a mixed liquor of trichloromethane and methanol, thereby prepare a nanometer self-locking bentonite film-forming agent.

According to the present disclosure, the acid is a concentrated hydrochloric acid or a concentrated sulfuric acid; the present disclosure does not impose specific limitation to the concentration of the concentrated acid, only if the concentrated acid can sufficiently erode metal atoms in the bentonite layer, destroy the intrinsic layered structure, and gradually convert to the amorphous low-dimensional sheet structure to produce the effect of sufficient cutting.

According to the present disclosure, the conditions of chemical slicing comprise a standing time of 6-24 h after dispersing under the condition of a temperature 20-60° C.; preferably a standing time of 12-15 h after dispersing under the condition of a temperature 22-30° C. In the present disclosure, concentrated hydrochloride acid or concentrated sulfuric acid is prepared, and the bentonite is added to standing still under the room temperature, in order to allow the two compounds to react sufficiently.

According to the present disclosure, step (1) also comprises further centrifuging the mixed liquor after dissolving with an acid and slicing, and repeatedly washing the centrifuged bentonite by further using a distilled water, in order to remove residual hydrochloride acid molecules, i.e., to obtain the nano-bentonite after slicing, wherein the distilled water is dropwise added for 10-12 batches, 20-30 mL of distilled water is dropwise added for each batch, and an interval of the dropwise adding is within a range of 1-1.5 h. Preferably, a slow magnetic stirring can be performed during the washing process.

According to the present disclosure, the long-chain polymeric material is one or more selected from the group consisting of octadecyl trimethyl ammonium chloride, cationic polyacrylamide and polyethyleneimine, preferably octadecyl trimethyl ammonium chloride.

According to the present disclosure, the concentration of the aqueous sodium chloride solution is within a range of 1-7 wt %, preferably 4-6 wt %; and the aqueous sodium chloride solution is used in an amount of 100-120 mL, relative to 100 mL of the acid.

According to the present disclosure, the long-chain polymeric material is used in an amount of 0.1-4 g, preferably 0.1-0.9 g, more preferably 0.1-0.5 g, relative to 100 mL of the acid.

According to the present disclosure, the second contact condition comprises a temperature of 20-50° C. and a time of 8-15 h; preferably, a temperature of 40-50° C. and a time of 10-12 h.

According to the present disclosure, the third contact condition comprises a temperature of 30-60° C. and a time of 2-6 h, preferably, a temperature of 50-55° C. and a time of 4-5 h.

According to the present disclosure, the method further comprises: prior to step (1), subjecting the nano-bentonite to a pulverization and dispersion treatment. In the present disclosure, a conventional nano-bentonite is subjected to a preliminary pulverizing and dispersing by an ultrasonic wave pulverizer with a model name 1000Y, wherein the ultrasonic pulverization is performed with an ultrasonic frequency of 30-40 KHz for 10-15 min; when the experiment is completed, the dispersion liquid is centrifuged, the upper and middle layer of white clay is taken.

According to the present disclosure, the clay is used in an amount of 1-15 g, preferably 3-12 g, relative to 100 mL of the acid.

According to the present disclosure, the low-dimensional nanometer self-locking bentonite is used in an amount of 0.1-2 g, the nano-bentonite is used in an amount of 0.1-2 g, and the structural bonding agent is used in an amount of 0.1-6 mL, with respect to 200 mL of water; preferably, the low-dimensional nanometer self-locking bentonite is used in an amount of 0.1-0.3 g, the nano-bentonite is used in an amount of 0.1-1 g, and the structural bonding agent is used in an amount of 0.4-5.2 mL, with respect to 200 mL of water; more preferably, the nano-bentonite is used in an amount of 0.1-0.5 g.

According to the present disclosure, the structural bonding agent is 3-aminopropyltrimethoxysilane, and in the present disclosure, the concentration of an aqueous 3-aminopropyltrimethoxysilane solution is 5.0% (v/v).

According to the present disclosure, the activation condition comprises a temperature of 40-60° C. and a time of 6-30 h; preferably a temperature of 50-55° C. and a time of 20-24 h. In the present disclosure, after the completion of activation, it is also possible to performing centrifugation with a centrifuge at a rotational speed of 5,000-6,000 rpm for 5-10 min, the bentonite at the bottom is carefully taken, and is repeatedly washed with methanol and centrifuged for more than 3 times. Finally, the bentonite is subjected to drying with a vacuum dryer at a temperature of 85-100° C. for 12-15 h, so as to obtain an active Bent-$NH_2$.

According to the present disclosure, the trichloromethane solution is used in an amount of 1-3 mL, the 2,2'-bipyridine complexing solution is used in an amount of 0.2-6 mL, the N,N,N',N'',N''-pentamethyl-diethylene-triamine crosslinker is used in an amount of 2-6 mg, relative to 10 mL of p-xylene solution; preferably, the trichloromethane solution is used in an amount of 1-3 mL, the 2,2'-bipyridine complexing solution is used in an amount of 0.5-4.5 mL, the N,N,N',N'',N''-pentamethyl-diethylene-triamine crosslinker is used in an amount of 3-4 mg, relative to 10 mL of p-xylene solution.

According to the present disclosure, the germination conditions comprise a temperature of 60-90° C. and a time of 6-12 h; preferably a temperature of 80-90° C.

In accordance with the present disclosure, the method further comprises the layer structure surface growth. The condensation and reflux are maintained, the free reaction under a constant temperature is performed for 6-7 h. Finally, a mixed liquor of trichloromethane and methanol is used for washing the centrifuged reaction liquid for 3 times or more, a nitrogen gas is introduced, and subjected to drying at 100-105° C. for 12-15 h, the product is sealed in a pot for storage.

According to a preferred embodiment of the present disclosure, as shown in FIG. 1, a method for preparing a low-dimensional nanometer self-locking bentonite comprises:

(1) Taking 100 mL of concentrated hydrochloric acid or concentrated sulfuric acid, adding nano-bentonite, subjecting the nano-bentonite to a preliminary pulverization and dispersion by using an ultrasonic wave pulverizer with a model name 1000Y, the ultrasonic pulverization is performed with an ultrasonic frequency of 30-40 kHz for a time of 10-15 min; when the experiment is completed, the dispersion liquid is centrifuged, 2-5 g of the upper and middle layer of white clay is taken; the clay is standing still at a room temperature of 22-30° C. for 12-15 h, in order to allow the two compounds to react sufficiently. After the sufficient reaction, the distilled water is dropwise added for 10-12 batches, each batch relates to a dropwise adding 20-30 mL of distilled water, and an interval of the dropwise adding is within a range of 1-1.5 h, a slow magnetic stirring is performed during the process;

(2) Chemical swelling and dispersion stripping. Then, 100 mL of aqueous sodium chloride solution with a high concentrated (with a concentration of 4-6 wt %) is further added and subjected to the magnetic stirring for 10-12 h, in order to further swell the collapsed layer structure with reduced dimensions, and expand an interval between the base layers. Subsequently, 0.1-0.9 g of octadecyl trimethyl ammonium chloride is further added and subjected to the magnetic stirring at 50-55° C. for 4-5 h to further spread apart the non-dispersed bentonite lamella after the stripping and swelling, in order to produce the effect of fully hydrating, dispersion and stripping, and further reduce the structural dimensions to produce a low-dimensional nano-bentonite. Finally, the bentonite with reduced-dimensions is subjected to repeated washing using a mixed solution of anhydrous ethanol and acetone to achieve the purification effect;

(3) Preparation of a dispersity slurry. Firstly, 200 mL of a nano-bentonite dispersing slurry with a low concentration (0.05%) is prepared; 0.1-0.3 g of the prepared low-dimensional nanometer self-locking bentonite is taken and mixed with 200 mL of distilled water and subjected to magnetic stirring at a room temperature (25° C.) for 24 h (supplemented with ultrasound), such that the nanometer self-locking bentonite is sufficiently dispersed, in order to provide a certain free-growth space for the subsequent layer surface modification;

(4) Surface activation of a layer structure. An aqueous solution of the structural bonding agent 3-aminopropyltrimethoxysilane is dropwise added with an amount of 0.4-5.2 mL under the condition of a constant temperature of 50° C., a concentration of the aqueous solution of the 3-aminopropyltrimethoxysilane is 5.0% (v/v), the mixture is sufficiently stirred for 24 h to impart a cardinal plane of bentonite with an active primary amine group. The mixture is then subjected to centrifugation by using a centrifuge at a rotational speed of 5,000-6,000 rpm for 5 min, the bentonite at the bottom is carefully taken, and is repeatedly washed with methanol and centrifuged for more than 3 times. Finally, the bentonite is subjected to drying with a vacuum dryer at a temperature of 85-100° C. for 12 h, so as to obtain an active Bent-$NH_2$;

(5) Layer structure surface germination. 1-3 mL dried trichromethane solution (containing 0.04 mL of an initiator, 2-bromoisobutyrylbromide) is slowly introduced under a premise of the protection with a nitrogen gas, the mixture is stirred slowly at 30° C. 0.2-6 mL of 2,2'-bipyridine complexing solution (containing 2 mg of cuprous bromide) and 10 mL of p-xylene solution (containing 20 mg of benzyl methacrylate) are subsequently introduced. Finally, the temperature is gradually increased to 90° C., and 3-4 mg of N,N,N',N'',N''-pentamethyl-diethylene-triamine crosslinker is then added;

(6) Layer structure surface growth. The condensation and reflux are maintained, the free reaction under a constant temperature is performed for 6 h. Finally, a mixed liquor of trichloromethane and methanol is used for washing the centrifuged reaction liquid for 3 times or more, a nitrogen gas is introduced, and subjected to drying at 105° C. for 12 h, the product is sealed in a pot for storage.

In a second aspect, the present disclosure provides a nanometer self-locking bentonite film-forming agent prepared with the aforesaid method.

According to the present disclosure, the film-forming agent introduces submetallic cuprous ions between the fence-type clay layers by using an atom controllable polymerization process (Atom Transfer Radical Polymerization or ATRP), based on the fence-type structure of natural bentonite, effectively controls the interlayer radical polymerization by taking advantage of an equilibrium mechanism between the dormant species and active species, which is a multilayer microstructure that may be spontaneously hydrophobic under a high temperature.

According to the present disclosure, the controlled layer structure growth technique is adopted such that the nanometer self-locking bentonite has an average particle size only within a range of 50-500 nm, preferably 100-200 nm, the nanometer self-locking bentonite can be combined with the internal structure of shale, and block moisture transfer at high temperature, extend the normal pressure transfer time to 63 h, increase the pressure transfer start-up time from 18 h to 41 h, greatly improve the shale stability and increase the safe drilling time.

In a third aspect, the present disclosure provides a film-forming drilling fluid, wherein the film-forming drilling fluid comprises an anti-collapse treatment agent and a filtrate reducer, wherein the anti-collapse treatment agent is the aforesaid nanometer self-locking bentonite film-forming agent.

According to the present disclosure, the filtrate reducer comprises one or more of a polymeric polyol, a modified starch, a sulfonated phenolic resin and sulfonated potassium humate.

According to the present disclosure, the anti-collapse treatment agent is contained in an amount of 1-5 wt %, and the filtrate reducer is contained in an amount of 1-3 wt %, based on the total weight of the film-forming drilling fluid; preferably, the anti-collapse treatment agent is contained in an amount of 1-1.5 wt %, and the filtrate reducer is contained in an amount of 2-2.5 wt %, based on the total weight of the film-forming drilling fluid.

According to the present disclosure, the film-forming drilling fluid further comprises a tackifier and/or a barite.

According to the present disclosure, the tackifier comprises carboxymethylcellulose and/or polyacrylamide.

According to the present disclosure, the tackifier is contained in an amount of 3-5 wt % and the barite is contained in an amount of 10-20 wt %, based on the total weight of the film-forming drilling fluid; preferably, the tackifier is contained in an amount of 3-3.5 wt % and the barite is contained in an amount of 15-20 wt %, based on the total weight of the film-forming drilling fluid.

The present disclosure will be described in detail below with reference to examples.

In the following Examples and Comparative Examples:

The variable temperature ultrasonic nanometer pulverizer with a model name 1000Y in use was purchased from Shanghai Qiqian Electronic Technology Co., Ltd.

The high-temperature high-pressure pressure transmitter with a model name HKY-3 was commercially available from Haian Petroleum Instrument Co., Ltd.

An integrated and fully intelligent electronic control system (the system was a part of an ultrasonic nanometer pulverizer), performed standardized monitoring and implementation through the whole course. The equipment allowed the following experimental parameters: ultrasonic power adjustable within a range of 10-1,200 W (1%-99%); allowable crushing capacity within a range of 50-1,200 mL; temperature control range from room temperature to 99° C.; single ultrasound allowed time of 0.1-9.9 s; single interval allowed time of 0.1-9.9 s.

The nano-bentonite in use was purchased from the Nano AG of Germany.

EXAMPLE 1

The example served to illustrate the preparation of low-dimensional nano-bentonite.

(1) The conventional nano-bentonite was subjected to a preliminary pulverization and dispersion by using an ultrasonic wave pulverizer with a model name 1000Y, the ultrasonic pulverization was performed with an ultrasonic frequency of 30 KHz for a time of 10 min; when the experiment was completed, the dispersion liquid was centrifuged, the upper and middle layer of white clay was taken.

(2) 100 mL of concentrated hydrochloride acid or concentrated sulfuric acid was prepared, 3 g of hyper-dispersed clay was added, the mixture was standing still at a room temperature of 22° C. for 12 h, in order to allow the two materials to function sufficiently. After the sufficient function, the distilled water was dropwise added for 10 batches, 20 mL of distilled water was dropwise added for each batch, and an interval of the dropwise adding was 1 h, a slow magnetic stirring was performed during the process.

(3) The chemical swelling and dispersion stripping were performed. Subsequently, 100 mL of aqueous sodium chloride solution with a high concentrated (with a concentration of 5 wt %) was further added and subjected to magnetic stirring at 50° C. for 12 h, in order to further swell the collapsed layer structure having reduced dimensions, and expanded an interval between the base layers. After that, 0.1 g of octadecyl trimethyl ammonium chloride was further added and subjected to stirring at 50° C. for 5 h to further spread apart the non-dispersed bentonite lamella after the stripping and swelling, in order to produce the effect of fully hydrating, dispersing and stripping, and further reduce the structural dimensions to produce a low-dimensional nano-bentonite. Finally, the bentonite with reduced-dimensions was subjected to repeated washing using a mixed solution of anhydrous ethanol and acetone to achieve the purification effect;

(4) Preparation of a dispersity slurry. Firstly, 200 mL of a nano-bentonite dispersing slurry with a low concentration (0.05%) was prepared; 0.1 g of the prepared low-dimensional nanometer self-locking bentonite was taken and mixed with 200 mL of distilled water and subjected to magnetic stirring at a room temperature (25° C.) for 24 h (supplemented with ultrasound), such that the nanometer self-locking bentonite was sufficiently dispersed, in order to provide a certain free-growth space for the subsequent layer surface modification; (preparation of nano-bentonite);

(5) Surface activation of a layer structure. 0.4 mL of an aqueous solution of the structural bonding agent 3-aminopropyltrimethoxysilane was dropwise added under the condition of a constant temperature of 50, a concentration of the aqueous solution of the 3-aminopropyltrimethoxysilane was 5.0% (v/v), the mixture was sufficiently stirred for 24 h to impart a cardinal plane of bentonite with an active primary amine group. The mixture was then subjected to centrifugation by using a centrifuge at a rotational speed of 5,000 rpm for 5 min, the bentonite at the bottom was carefully taken, and was repeatedly washed with methanol and centrifuged for more than 3 times. Finally, the bentonite was subjected to drying with a vacuum dryer at a temperature of 85° C. for 12 h, so as to obtain an active Bent-$NH_2$;

(6) Layer structure surface germination. 1 mL of dried trichromethane solution (containing 0.04 mL of an initiator, 2-bromoisobutyrylbromide) was slowly introduced under a premise of the protection with nitrogen gas, the mixture was stirred slowly at 30° C. 0.5 mL of 2,2'-bipyridine complexing solution (containing 2 mg of cuprous bromide) and 10 mL of p-xylene solution (containing 20 mg of benzyl methacrylate) were subsequently introduced. Finally, the temperature was gradually raised to 90° C., and 4 mg of N,N,N',N'',N''-pentamethyl-diethylene-triamine crosslinker was then added for carrying out germination for 6 h;

(7) Layer structure surface growth. The condensation and reflux were maintained, the free reaction under a constant temperature was performed for 6 h. Finally, a mixed liquor of trichloromethane and methanol was used for washing the centrifuged reaction liquid for 3 times or more, nitrogen gas was introduced, and subjected to drying at 105° C. for 12 h, the product was sealed in a pot for storage.

The finally prepared product was a nanometer self-locking thermally responsive bentonite film-forming agent (Nano-GB-bent), labeled as formed film 3# (or labeled as S1), the nanometer self-locking thermally responsive bentonite film-forming agent (Nano-GB-bent) had an average particle size of 153 nm, with cuprous ions introduced between the fence-type clay layers of natural bentonite, effectively controlled interlayer radical polymerization using a balance mechanism of dormant species and active species, it was a high-temperature spontaneously hydrophobic multilayer microstructure.

Figure 2:
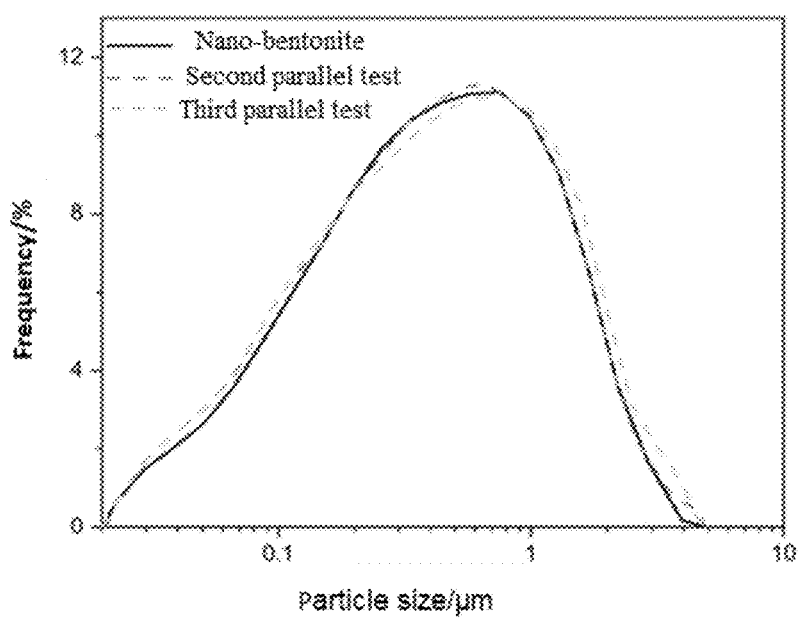
FIG. 2 is a graph showing the particle size distribution of the nano-bentonite.

FIG. 2 was a graph showing the particle size distribution of the nano-bentonite; as can be seen from FIG. 2: the results from three parallel tests revealed that the particle size distribution range was from 0.02-4.96 µm, and the average particle size was 708 nm, it showed that the vast majority of the particles were nano-scale particles, but the particle size was relatively large, which needed to be further improved.

FIG. 3(a) was a view showing a microstructure of the nano-bentonite; as can be seen from FIG. 3(a), the nano-bentonite structure was still formed by stacking the layer structure, the particle size was not uniform (depending on the number of stacked layers and the size of a surface area of a single layer), and the largest particles had a particle diameter larger than 3 µm, which was consistent with the above-mentioned results of the particle size distribution illustrated in FIG. 2. In particular, the layer structure was remarkably damaged or stripped, but the separation between the layers or the ends was incomplete, so that larger particles were still present.

Figure 3:
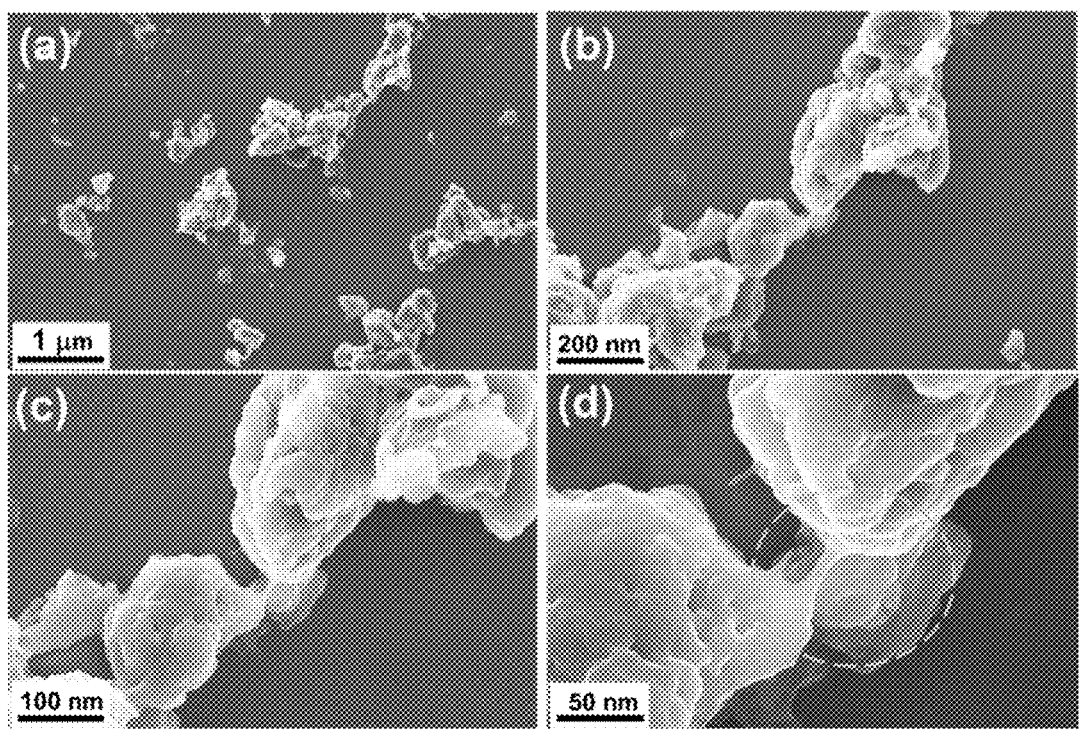
FIG. 3 is a view showing a microstructure of the nano-bentonite.

Further, the layer structure which was not completely separated was subjected to a local analysis, as shown in FIG. 3(b), FIG. 3 (c) and FIG. 3 (d). It can be seen that the incomplete cutting of the bridged lamella was the root cause which resulted in the incomplete separation of the layered structure (i.e., the larger particle size). In particular, FIG. 3(d) illustrated the structure of the monolithic layer with the Frit maximum radius about 50 nm. If the lamella can be further peeled off, such that a nanomaterial with lower dimensions can be certainly obtained.

Figure 4:
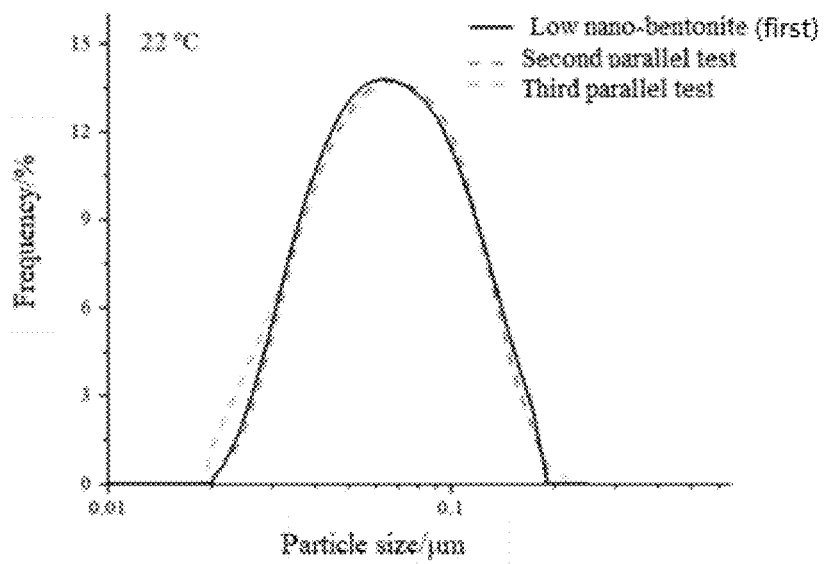
FIG. 4 is a graph showing the particle size distribution of the low-dimensional nanometer self-locking bentonite of the present disclosure under the condition of room temperature.

FIG. 4 was a graph showing the particle size distribution of the low-dimensional nanometer self-locking bentonite of the present disclosure under the condition of room temperature; as can be seen from FIG. 4, the distribution of particle size was within a range of 0.02-0.2 μm, but most of the particle size was smaller than 100 nm, and an average particle size was 63 nm, demonstrating that prepared low-dimensional bentonite had a potential of plugging the ultra-nanometer scale pores of shale. Three parallel tests, compared to the original nano-bentonite, showed that the peaks of the particle size distribution were significantly bunched leftward and the distribution was within a range of 20-225 nm. It illustrated that the volume of the spatial structure of the individual original nano-bentonite was significantly decreased, which confirmed the effectiveness of the cutting process in experiments. The low-dimensional nano-bentonite had an average particle size of 63 nm, which was sharply decreased by 91.10%, the particle size was similar to the Frit radius of the monolithic layer discovered in FIG. 3(d), illustrating that the multilayered structure was efficiently destroyed, and the majority of which was efficiently decomposed into monolayer lamella structure. It was noteworthy that the percentage distribution of the ultra-nanometer interval of particle size smaller than 100 nm (the interval was suitable for plugging the ultra-nanometer size pores) increases by 282%, further proving that the multi-layered layer structure was substantially destroyed, facilitating the further preparation of the nano-scale self-locking bentonite.

Figure 5:
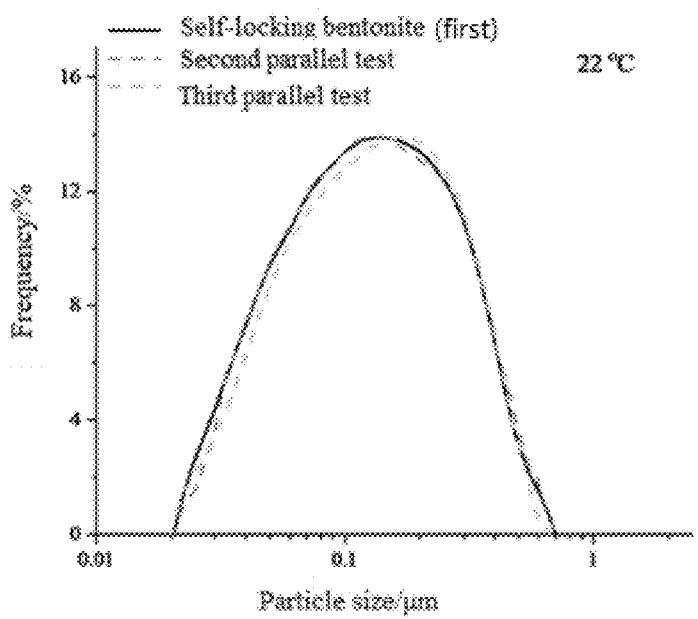
FIG. 5 is a graph showing the particle size distribution prior to the low-dimensional nanometer self-locking bentonite of the present disclosure prior to the thermal response.

FIG. 5 illustrated a graph showing the particle size distribution prior to the low-dimensional nanometer self-locking bentonite of the present disclosure prior to the thermal response. As can be seen from FIG. 5, three parallel tests results indicated that the nanometer self-locking bentonite had an effective particle size distribution range of 20-700 nm, and an average particle size of 153 nm. Compared with the particle size distribution of low-dimensional nano-bentonite before modification, the particle size distribution showed an expansion towards the right side, the maximum measured particle size was increased by 211%, the average particle size was increased with an amplitude of 143%. The phenomenon demonstrated the controlled growth of molecules on the surface of the layer structure, the steric radius of the particles was increased by growing flexible molecular chains on the surface.

Figure 6:
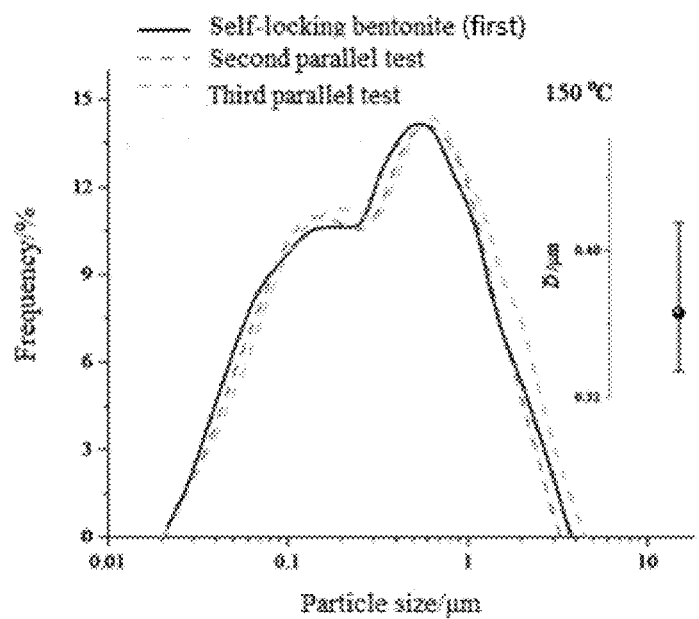
FIG. 6 is a graph showing the particle size distribution of the low-dimensional nanometer self-locking bentonite in the present disclosure after the thermal response.

FIG. 6 illustrated a graph showing the particle size distribution of the low-dimensional nanometer self-locking bentonite in the present disclosure after the thermal response; as can be seen from FIG. 6, the peak shape of the particle size distribution peak after the thermal response was significantly different from the particle size distribution before the thermal response, it was changed from a single peak to a double peak distribution (i.e. a "hump-shaped" peak), the appearance of the double peak distribution predicted that the original part of the single and separated layer structures were effectively brought together, re-stacked and synthesized into a multi-dimensional layer structure, and the spatial dimensions of the particles were effectively increased. In particular, the average particle size was increased from 0.15 μm to 0.36 μm, with an increase amplitude of 140%, and the distribution value of maximum particle size was increased from 0.71 μm to 3.72 μm. Each of the above results indicated the re-stacking of the layer structure, which was associated with the thermally responsive self-locking behavior of the self-locking layer structure. In particular, the percentage distribution in the super-nanometer range was further finely calculated, and the percentage of the nanometer self-locking bentonite in the range of 20-100 nm resulting from the self-locking behavior still reached 26.38%, indicating that a portion of the self-locked particles can still be applied in plugging the super-nanometer pores so as to cope with the potential extremely nanometer-sized pores.

Figure 7:
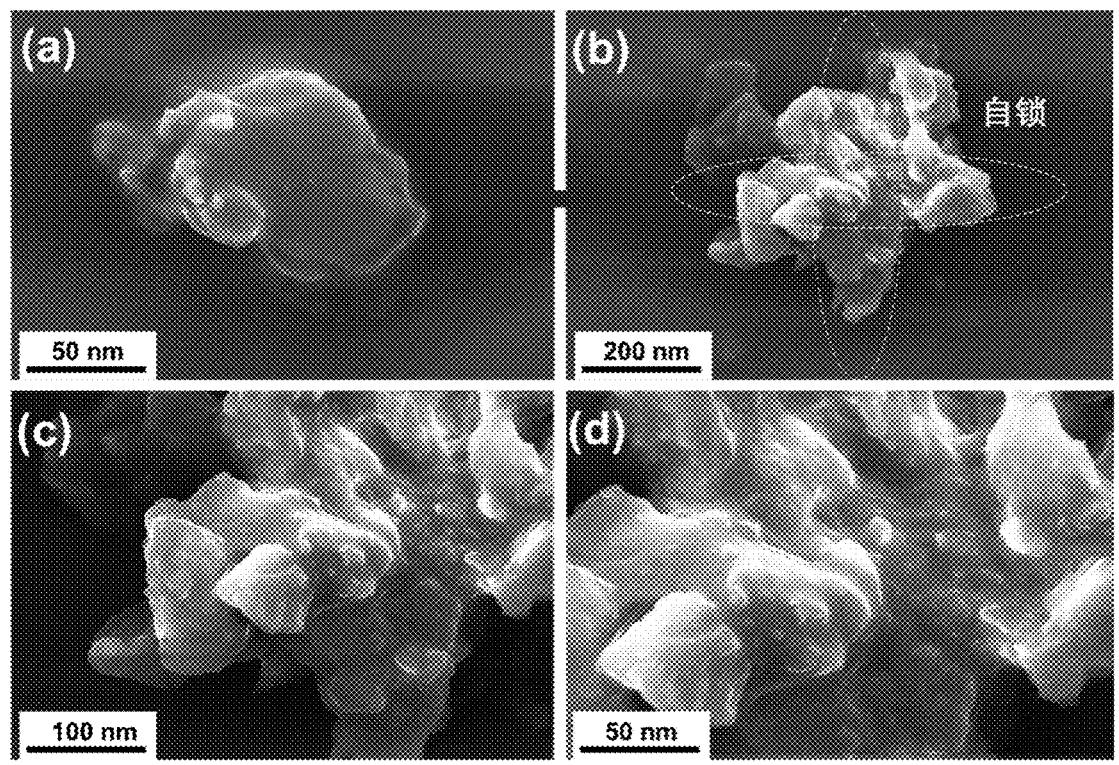
FIG. 7 illustrates a self-locking structure before and after the thermal response.

FIG. 7 illustrated a self-locking structure before and after the thermal response; as can be seen from FIG. 7, based on Ferret's particle geometry determination method, the geometry particle size before thermal response characterized by SEM was about 120 nm, which was corresponding to the laser particle size measurement result. In addition, the nanometer self-locking bentonite had lower dimensions before the thermal response, approximating to a monolayer lamella structure, with a surface covered with a distinct soft gel morphology of BzMA polymer.

After the thermal response (150° C.), the steric geometric pattern of the nanometer self-locking bentonite was shown in FIG. 7(b). The self-locking bentonite structure after the thermal response was a multi-dimensional cross-linked structure, with a SEM geometry particle size of 320 nm, the spatial particle size was increased by 167%, indicating the effectiveness of the self-locking structure. In addition, the free coupled morphology was characterized by a "cross" spatial association rule, which was related to the composition of the material, wherein an inner core was a bentonite lamella, and an outer layer was a flexible functional molecule.

Furthermore, the binding structure after self-locking was dissected and analyzed. As can be seen from FIG. 7(c) and FIG. 7(d), due to the activation of self-locking structures, the layers and layers were mingled and internally gathered together to form a hybrid multidimensional spatial binding structure, i.e., a multi-dimensional spatial structure formed by spontaneous binding of free natural particles.

At the same time, the hybrid structure had a high strength, and was composed of a matrix with bentonite mineral as the main component therein, the associated growth was wrapped with thermally responsive BzMA soft material (imparting the material a certain deformable zone), which can be compressed into defined shale pores, facilitating the formation of flexible membranes with a certain structural strength inside the pores.

In summary, the nanometer self-locking bentonite film-forming agent was the thermally responsive film-forming agent on the nanometer scale with the potential to be applied in the protection of nanometer-scale shale pores.

Figure 8:
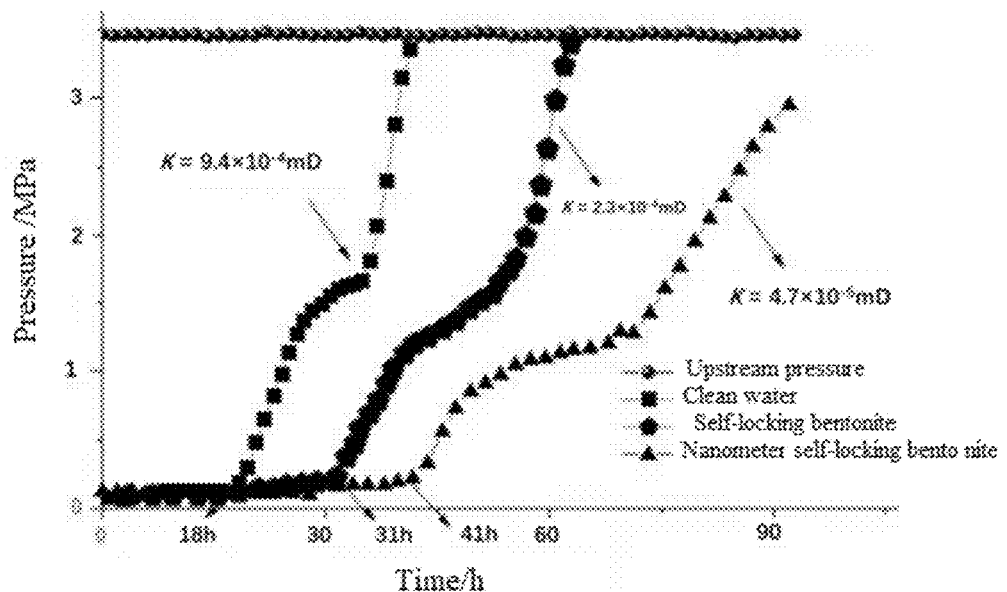
FIG. 8 shows an influence of self-locking thermal response bentonite anti-collapse liquid on the shale pressure transfer.

FIG. 8 showed an influence of self-locking thermal response bentonite anti-collapse liquid on the shale pressure transfer. As can be seen from FIG. 8, during a 90-hour pressure monitoring process, the rock cores were substantially pressure-penetrated in the tests. When the pressure transfer fluid in tests was clean water, the experimental records demonstrated that the permeability was $9.4 \times 10^{-4}$ mD with a pressure transfer time of 40 h. When the pressure transfer fluid in tests was high performance cationic emulsified asphalt (see FIG. 9), the pressure transfer time was increased to 56 h, the permeability was decreased by 27.65%, indicating that the cationic emulsified asphalt had desirable high temperature filtrate reduction property, the main reason was that the cationic emulsified asphalt had a high temperature softening performance and could be embedded in part of the shale pores to block intrusion of subsequent water, but it cannot completely block water intrusion.

Differently, the introduction of the self-locking bentonite can effectively extend the pressure transfer time to 63 h, and reduce the transfer permeability to $2.3 \times 10^{-4}$ mD, the time of initiating pressure is also increased from 27 h to 31 h with an increase amplitude of 15%. The time of initiating pressure (ti) was an important parameter characterizing the air-tightness of the outer surface of the rock core, the larger was the ti value, indicating that the higher air-tightness was the outer surface of the rock core, where the increased ti value indicated that an air-tightness of a film formed by the self-locking bentonite was stronger than that of a film formed by the asphalt, thereby effectively delaying the transfer of pressure.

However, the overall transfer time was not effectively improved, and the pressure transfer ascent stage was similar to the transfer experiment for shale under an influence of the cationic emulsified asphalt, suggesting that the self-locking bentonite cannot effectively fill the internal pores of the shale. The reason may be that the internal pores of the shale was dominated by nano-scale pores, the micron-sized particles can hardly access the nano-scale pores and build a water-blocking film inside having a certain strength.

Fortunately, the nanometer self-locking bentonite produced the desired test anti-collapse effects in regard to the two major challenges mentioned above, i.e., the construction of an extima and an intima.

Figure 9:
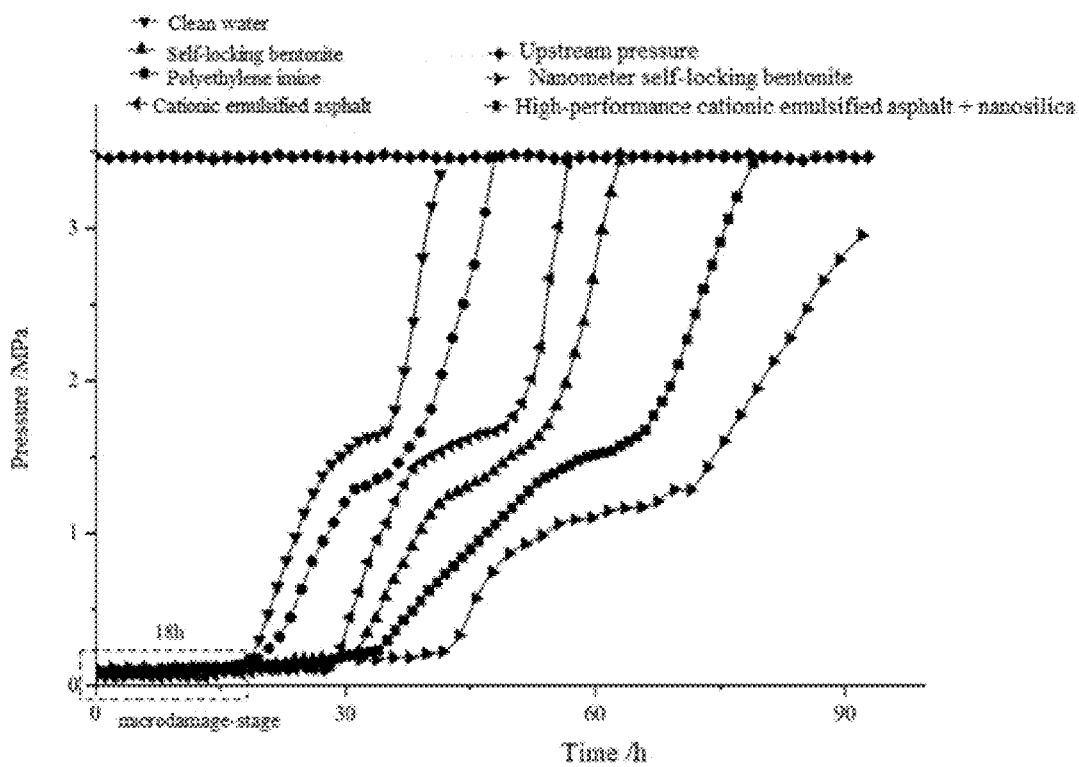
FIG. 9 shows an influence of different types of anti-collapse liquids on the shale pressure transfer.

FIG. 9 showed an influence of different types of anti-collapse liquids on the shale pressure transfer. As can be seen from FIG. 9, the shale pressure transmission experiments under the action of nanometer self-locking bentonite, the initiation time of pressure was further increased, its increase amplitudes over the cationic emulsified asphalt and the self-locking bentonite were 52% and 32%, respectively, demonstrating that the extima built by the nanometer self-locking bentonite has higher air-tightness than the air-tightness of a film formed by the emulsified asphalt and the self-locking bentonite, proving the compaction of film formed by the nanometer self-locking bentonite. On the other hand, it was discovered from the experiments that the growth section of pressure transmission was also significantly different from the pressure growth sections of the cationic emulsified asphalt and the self-locking bentonite, the growth process was significantly slowed down, and the permeability recorded from the experiments was further decreased to $4.7 \times 10^{-5}$ mD. In addition, the downstream pressure did not reach the upstream pressure during the monitoring process for 90 h, illustrating that the pressure was not completely penetrated. The experimental results were consistent with the high temperature self-lock structure of the nanometer self-locking bentonite, and the constructed nanometer self-locking bentonite was capable of entering the shale internal structure, spontaneously formed an internal waterproof membrane structure under high-temperature environmental conditions, and suppressed the passing of subsequent moisture, thereby improving the high-temperature anti-collapse property of the shale.

Figure 10:
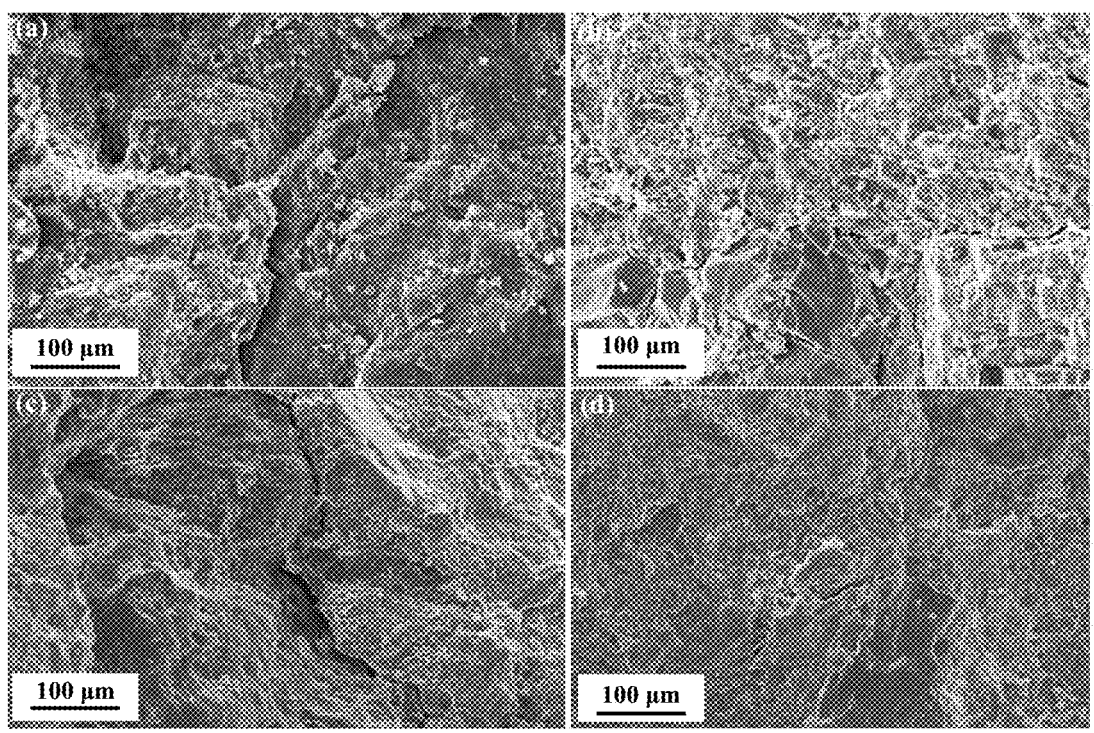
FIG. 10 illustrates the Scanning Electron Microscope (SEM) images of shale after the pressure transfer.

FIG. 10 illustrated the Scanning Electron Microscope (SEM) images of shale after the pressure transfer; as can be seen from FIG. 10(a), after the pressure transfer with clean water, the bentonite particles in the shale were clearly dispersed, and there were significant collapse cracks in the shale body, which formed the passage for quick release of pressure.

When the cationic emulsified asphalt was used for pressure transfer, there was not significant large cracks, see FIG. 10(c), it demonstrated that the cationic emulsified asphalt had some collapse resistance to the shale. However, there were still many micro-cracks, the collapsed shale structure was relatively loose, and a great quantity of dispersed bentonite particles were found, indicating that there were still a lot of moisture penetrating the internal pores of the shale and initiating hydration and dispersion of the internal bentonite minerals.

In particular, the structure of shale after the pressure transfer using the self-locking bentonite fluid was kept intact despite the presence of obvious cracks, with reference to FIG. 10(b), wherein the apparent dispersion phenomenon of bentonite was not observed, and the crack behavior was a brittle crack, indicating that there was not severe hydration and erosion inside the shale, and the collapse behavior was mainly caused by the fracturing due to the pressure imbalance.

Further, after the pressure transfer by using the nanometer self-locking bentonite, the internal shale structure was as shown in FIG. 10 (d). As can be seen that the shale structure was well preserved, the significant cracks and obvious hydration and erosion were not observed. The phenomenon was consistent with the above pressure transfer experiments, it demonstrated that the nanometer self-locking bentonite effectively built a high temperature self-locking type intima at the front end of pores to block delivery of water molecules, thereby protecting the internal structure of shale.

EXAMPLE 2

(1) The conventional nano-bentonite was subjected to a preliminary pulverization and dispersion by using an ultrasonic wave pulverizer with a model name 1000Y, the ultrasonic pulverization was performed with an ultrasonic frequency of 30 kHz for a time of 10 min; when the experiment was completed, the dispersion liquid was centrifuged, the upper and middle layer of white clay was taken;

(2) 100 mL of concentrated hydrochloride acid or concentrated sulfuric acid was prepared, 5 g of hyper-dispersed clay was added, the mixture was standing still at a room temperature of 22° C. for 12 h, in order to allow the two materials to function sufficiently. After the sufficient function, the distilled water was dropwise added for 10 batches, 20 mL of distilled water was dropwise added for each batch, and an interval of the dropwise adding was 1 h, a slow magnetic stirring was performed during the process;

(3) The chemical swelling and dispersion stripping were performed. Subsequently, 100 mL of aqueous sodium chloride solution with a high concentrated (with a concentration of 5 wt %) was further added and subjected to magnetic stirring at 50° C. for 12 h, in order to further swell the collapsed layer structure having reduced dimensions, and expanded an interval between the base layers. After that, 0.2 g of octadecyl trimethyl ammonium chloride was further added and subjected to stirring at 50° C. for 5 h to further spread apart the non-dispersed bentonite lamella after the stripping and swelling, in order to produce the effect of fully hydrating, dispersing and stripping, and further reduce the structural dimensions to produce a low-dimensional nano-bentonite. Finally, the bentonite with reduced-dimensions was subjected to repeated washing using a mixed solution of anhydrous ethanol and acetone to achieve the purification effect;

(4) Preparation of a dispersity slurry. Firstly, 200 mL of a nano-bentonite dispersing slurry with a low concentration (0.05%) was prepared; 0.2 g of the prepared low-dimensional nanometer self-locking bentonite was taken and mixed with 200 mL of distilled water and subjected to magnetic stirring at a room temperature (25° C.) for 24 h (supplemented with ultrasound), such that the nanometer self-locking bentonite was sufficiently dispersed, in order to provide a certain free-growth space for the subsequent layer surface modification;

(5) Surface activation of a layer structure. 0.6 mL of an aqueous solution of the structural bonding agent 3-aminopropyltrimethoxysilane was dropwise added under the condition of a constant temperature of 50° C., a concentration of the aqueous solution of the 3-aminopropyltrimethoxysilane was 5.0% (v/v), the mixture was sufficiently stirred for 24 h to impart a cardinal plane of bentonite with an active primary amine group. The mixture was then subjected to centrifugation by using a centrifuge at a rotational speed of 5,000 rpm for 5 min, the bentonite at the bottom was carefully taken, and was repeatedly washed with methanol and centrifuged for 3 times or more. Finally, the bentonite was subjected to drying with a vacuum dryer at a temperature of 85° C. for 12 h, so as to obtain an active Bent-$NH_2$;

(6) Layer structure surface germination. 1 mL of dried trichromethane solution (containing 0.04 mL of an initiator, 2-bromoisobutyrylbromide) was slowly introduced under a premise of the protection with nitrogen gas, the mixture was stirred slowly at 30° C. 0.5 mL of 2,2'-bipyridine complexing solution (containing 2 mg of cuprous bromide) and 10 mL of p-xylene solution (containing 20 mg of benzyl methacrylate) were subsequently introduced. Finally, the temperature was gradually raised to 90° C., and 4 mg of N,N,N',N'',N''-pentamethyl-diethylene-triamine crosslinker was then added for carrying out germination for 6 h;

(7) Layer structure surface growth. The condensation and reflux were maintained, the free reaction under a constant temperature was performed for 6 h. Finally, a mixed liquor of trichloromethane and methanol was used for washing the centrifuged reaction liquid for 3 times or more, nitrogen gas was introduced, and subjected to drying at 105° C. for 12 h, the product was sealed in a pot for storage.

The finally prepared product was a nanometer self-locking thermally responsive bentonite film-forming agent (Nano-GB-bent), labeled as S2, the nanometer self-locking thermally responsive bentonite film-forming agent (Nano-GB-bent) had a particle size within a range of 300-400 nm, with cuprous ions introduced between the fence-type clay layers of natural bentonite, effectively controlled interlayer radical polymerization using a balance mechanism of dormant species and active species, it was a high-temperature spontaneously hydrophobic multilayer microstructure.

EXAMPLE 3

(1) The conventional nano-bentonite was subjected to a preliminary pulverization and dispersion by using an ultrasonic wave pulverizer with a model name 1000Y, the ultrasonic pulverization was performed with an ultrasonic frequency of 30 kHz for a time of 10 min; when the experiment was completed, the dispersion liquid was centrifuged, the upper and middle layer of white clay was taken;

(2) 100 mL of concentrated hydrochloride acid or concentrated sulfuric acid was prepared, 8 g of hyper-dispersed clay was added, the mixture was standing still at a room temperature of 22° C. for 12 h, in order to allow the two materials to function sufficiently. After the sufficient function, the distilled water was dropwise added for 10 batches, 20 mL of distilled water was dropwise added for each batch, and an interval of the dropwise adding was 1 h, a slow magnetic stirring was performed during the process;

(3) The chemical swelling and dispersion stripping were performed. Subsequently, 100 mL of aqueous sodium chloride solution with a high concentrated (with a concentration of 5 wt %) was further added and subjected to magnetic stirring at 50° C. for 12 h, in order to further swell the collapsed layer structure having reduced dimensions, and expanded an interval between the base layers. After that, 0.3 g of octadecyl trimethyl ammonium chloride was further added and subjected to stirring at 50° C. for 5 h to further spread apart the non-dispersed bentonite lamella after the stripping and swelling, in order to produce the effect of fully hydrating, dispersing and stripping, and further reduce the structural dimensions to produce a low-dimensional nano-bentonite. Finally, the bentonite with reduced-dimensions was subjected to repeated washing using a mixed solution of anhydrous ethanol and acetone to achieve the purification effect;

(4) Preparation of a dispersity slurry. Firstly, 200 mL of a nano-bentonite dispersing slurry with a low concentration (0.05%) was prepared; 0.3 g of the prepared low-dimensional nanometer self-locking bentonite was taken and mixed with 200 mL of distilled water and subjected to magnetic stirring at a room temperature (25° C.) for 24 h (supplemented with ultrasound), such that the nanometer self-locking bentonite was sufficiently dispersed, in order to provide a certain free-growth space for the subsequent layer surface modification;

(5) Surface activation of a layer structure. 1.2 mL of an aqueous solution of the structural bonding agent 3-aminopropyltrimethoxysilane was dropwise added under the condition of a constant temperature of 50° C., a concentration of the aqueous solution of the 3-aminopropyltrimethoxysilane was 5.0% (v/v), the mixture was sufficiently stirred for 24 h to impart a cardinal plane of bentonite with an active primary amine group. The mixture was then subjected to centrifugation by using a centrifuge at a rotational speed of 5,000 rpm for 5 min, the bentonite at the bottom was carefully taken, and was repeatedly washed with methanol and centrifuged for 3 times or more. Finally, the bentonite was subjected to drying with a vacuum dryer at a temperature of 85° C. for 12 h, so as to obtain an active Bent-$NH_2$.

(6) Layer structure surface germination. 1 mL of dried trichromethane solution (containing 0.08 mL of an initiator, 2-bromoisobutyrylbromide) was slowly introduced under a premise of the protection with nitrogen gas, the mixture was stirred slowly at 30° C. 1.5 mL of 2,2'-bipyridine complexing solution (containing 4 mg of cuprous bromide) and 10 mL of p-xylene solution (containing 40 mg of benzyl methacrylate) were subsequently introduced. Finally, the temperature was gradually raised to 90° C., and 4 mg of N,N,N',N'',N''-pentamethyl-diethylene-triamine crosslinker was then added for carrying out germination for 12 h;

(7) Layer structure surface growth. The condensation and reflux were maintained, the free reaction under a constant temperature was performed for 6 h. Finally, a mixed liquor of trichloromethane and methanol was used for washing the centrifuged reaction liquid for 3 times or more, nitrogen gas was introduced, and subjected to drying at 105° C. for 12 h, the product was sealed in a pot for storage.

The finally prepared product was a nanometer self-locking thermally responsive bentonite film-forming agent (Nano-GB-bent), labeled as S3, the nanometer self-locking thermally responsive bentonite film-forming agent (Nano-GB-bent) had a particle size within a range of 300-400 nm, with cuprous ions introduced between the fence-type clay layers of natural bentonite, effectively controlled interlayer radical polymerization using a balance mechanism of dormant species and active species, it was a high-temperature spontaneously hydrophobic multilayer microstructure.

EXAMPLE 4

(1) The conventional nano-bentonite was subjected to a preliminary pulverization and dispersion by using an ultrasonic wave pulverizer with a model name 1000Y, the ultrasonic pulverization was performed with an ultrasonic frequency of 30 kHz for a time of 10 min; when the experiment was completed, the dispersion liquid was centrifuged, the upper and middle layer of white clay was taken;

(2) 100 mL of concentrated hydrochloride acid or concentrated sulfuric acid was prepared, 12 g of hyper-dispersed clay was added, the mixture was standing still at a room temperature of 22° C. for 12 h, in order to allow the two materials to function sufficiently. After the sufficient function, the distilled water was dropwise added for 10 batches, 20 mL of distilled water was dropwise added for each batch, and an interval of the dropwise adding was 1 h, a slow magnetic stirring was performed during the process;

(3) The chemical swelling and dispersion stripping were performed. Subsequently, 100 mL of aqueous sodium chloride solution with a high concentrated (with a concentration of 5 wt %) was further added and subjected to magnetic stirring at 50° C. for 12 h, in order to further swell the collapsed layer structure having reduced dimensions, and expanded an interval between the base layers. After that, 0.9 g of octadecyl trimethyl ammonium chloride was further added and subjected to stirring at 50° C. for 5 h to further spread apart the non-dispersed bentonite lamella after the stripping and swelling, in order to produce the effect of fully hydrating, dispersing and stripping, and further reduce the structural dimensions to produce a low-dimensional nano-bentonite. Finally, the bentonite with reduced-dimensions was subjected to repeated washing using a mixed solution of anhydrous ethanol and acetone to achieve the purification effect;

(4) Preparation of a dispersity slurry. Firstly, 200 mL of a nano-bentonite dispersing slurry with a low concentration (0.05%) was prepared; 0.3 g of the prepared low-dimensional nanometer self-locking bentonite was taken and mixed with 200 mL of distilled water and subjected to magnetic stirring at a room temperature (25° C.) for 24 h (supplemented with ultrasound), such that the nanometer self-locking bentonite was sufficiently dispersed, in order to provide a certain free-growth space for the subsequent layer surface modification;

(5) Surface activation of a layer structure. 4.2 mL of an aqueous solution of the structural bonding agent 3-aminopropyltrimethoxysilane was dropwise added under the condition of a constant temperature of 50° C., a concentration of the aqueous solution of the 3-aminopropyltrimethoxysilane was 5.0% (v/v), the mixture was sufficiently stirred for 24 h to impart a cardinal plane of bentonite with an active primary amine group. The mixture was then subjected to centrifugation by using a centrifuge at a rotational speed of 5,000 rpm for 5 min, the bentonite at the bottom was carefully taken, and was repeatedly washed with methanol and centrifuged for 3 times or more. Finally, the bentonite was subjected to drying with a vacuum dryer at a temperature of 85° C. for 12 h, so as to obtain an active Bent-$NH_2$;

(6) Layer structure surface germination. 3 mL of dried trichromethane solution (containing 0.1 mL of an initiator, 2-bromoisobutyrylbromide) was slowly introduced under a premise of the protection with nitrogen gas, the mixture was stirred slowly at 30° C. 4.5 mL of 2,2'-bipyridine complexing solution (containing 5 mg of cuprous bromide) and 10 mL of p-xylene solution (containing 50 mg of benzyl methacrylate) were subsequently introduced. Finally, the temperature was gradually raised to 90° C., and 4 mg of N,N,N',N'',N''-pentamethyl-diethylene-triamine crosslinker was then added for carrying out germination for 12 h;

(7) Layer structure surface growth. The condensation and reflux were maintained, the free reaction under a constant temperature was performed for 6 h. Finally, a mixed liquor of trichloromethane and methanol was used for washing the centrifuged reaction liquid for 3 times or more, nitrogen gas was introduced, and subjected to drying at 105° C. for 12 h, the product was sealed in a pot for storage.

The finally prepared product was a nanometer self-locking thermally responsive bentonite film-forming agent (Nano-GB-bent), labeled as S4, the nanometer self-locking thermally responsive bentonite film-forming agent (Nano-GB-bent) had a particle size within a range of 500-600 nm, with cuprous ions introduced between the fence-type clay layers of natural bentonite, effectively controlled interlayer radical polymerization using a balance mechanism of dormant species and active species, it was a high-temperature spontaneously hydrophobic multilayer microstructure.

EXAMPLE 5

(1) The conventional nano-bentonite was subjected to a preliminary pulverization and dispersion by using an ultrasonic wave pulverizer with a model name 1000Y, the ultrasonic pulverization was performed with an ultrasonic frequency of 30 kHz for a time of 20 min; when the experiment was completed, the dispersion liquid was centrifuged, the upper and middle layer of white clay was taken;

(2) 100 mL of concentrated hydrochloride acid or concentrated sulfuric acid was prepared, 8 g of hyper-dispersed clay was added, the mixture was standing still at a room temperature of 22° C. for 12 h, in order to allow the two materials to function sufficiently. After the sufficient function, the distilled water was dropwise added for 10 batches, 20 mL of distilled water was dropwise added for each batch, and an interval of the dropwise adding was 1 h, a slow magnetic stirring was performed during the process;

(3) The chemical swelling and dispersion stripping were performed. Subsequently, 100 mL of aqueous sodium chloride solution with a high concentrated (with a concentration of 5 wt %) was further added and subjected to magnetic stirring at 50° C. for 12 h, in order to further swell the collapsed layer structure having reduced dimensions, and expanded an interval between the base layers. After that, 0.9 g of octadecyl trimethyl ammonium chloride was further added and subjected to stirring at 50° C. for 5 h to further spread apart the non-dispersed bentonite lamella after the stripping and swelling, in order to produce the effect of fully hydrating, dispersing and stripping, and further reduce the structural dimensions to produce a low-dimensional nano-bentonite. Finally, the bentonite with reduced-dimensions was subjected to repeated washing using a mixed solution of anhydrous ethanol and acetone to achieve the purification effect;

(4) Preparation of a dispersity slurry. Firstly, 200 mL of a nano-bentonite dispersing slurry with a low concentration (0.05%) was prepared; 0.3 g of the prepared low-dimensional nanometer self-locking bentonite was taken and mixed with 200 mL of distilled water and subjected to magnetic stirring at a room temperature (25° C.) for 24 h (supplemented with ultrasound), such that the nanometer self-locking bentonite was sufficiently dispersed, in order to provide a certain free-growth space for the subsequent layer surface modification;

(5) Surface activation of a layer structure. 5.2 mL of an aqueous solution of the structural bonding agent 3-aminopropyltrimethoxysilane was dropwise added under the condition of a constant temperature of 50, a concentration of the aqueous solution of the 3-aminopropyltrimethoxysilane was 5.0% (v/v), the mixture was sufficiently stirred for 24 h to impart a cardinal plane of bentonite with an active primary amine group. The mixture was then subjected to centrifugation by using a centrifuge at a rotational speed of 5,000 rpm for 5 min, the bentonite at the bottom was carefully taken, and was repeatedly washed with methanol and centrifuged for 3 times or more. Finally, the bentonite was subjected to drying with a vacuum dryer at a temperature of 85° C. for 12 h, so as to obtain an active Bent-$NH_2$;

(6) Layer structure surface germination. 3 mL of dried trichromethane solution (containing 0.12 mL of an initiator, 2-bromoisobutyrylbromide) was slowly introduced under a premise of the protection with nitrogen gas, the mixture was stirred slowly at 30° C. 4.5 mL of 2,2'-bipyridine complexing solution (containing 6 mg of cuprous bromide) and 10 mL of p-xylene solution (containing 60 mg of benzyl methacrylate) were subsequently introduced. Finally, the temperature was gradually raised to 90° C., and 4 mg of N,N,N',N'',N''-pentamethyl-diethylene-triamine crosslinker was then added for carrying out germination for 12 h;

(7) Layer structure surface growth. The condensation and reflux were maintained, the free reaction under a constant temperature was performed for 6 h. Finally, a mixed liquor of trichloromethane and methanol was used for washing the centrifuged reaction liquid for 3 times or more, nitrogen gas was introduced, and subjected to drying at 105° C. for 12 h, the product was sealed in a pot for storage.

The finally prepared product was a nanometer self-locking thermally responsive bentonite film-forming agent (Nano-GB-bent), labeled as S5, the nanometer self-locking thermally responsive bentonite film-forming agent (Nano-GB-bent) had a particle size within a range of 600-700 nm, with cuprous ions introduced between the fence-type clay layers of natural bentonite, effectively controlled interlayer radical polymerization using a balance mechanism of dormant species and active species, it was a high-temperature spontaneously hydrophobic multilayer microstructure.

COMPARATIVE EXAMPLE 1

An intercalated thermally responsive bentonite film-forming agent (CB-bent) was used, labeled as the formed-film 1#, wherein the preparation method the film-forming agent (CB-bent) was as follows:

The bentonite was essentially composed of a layered montmorillonite structure, a surface and an end face of the montmorillonite unit cell were usually rich in hydroxyl functional groups, which were prone to form hydrogen bonding with active functional groups of an intercalator. On this basis, an intercalated complex of NIPAM and bentonite can be easily prepared. First, bentonite was subjected to drying in a drying oven at 150° C. for 24 h, 4 g bentonite was then introduced into 100 mL of aqueous NIPAM solution (with a mass fraction 3% of NIPAM) and stirred at constant temperature of 30° C. for 24 h, in order to achieve sufficient action of the NIPAM monomer and bentonite.

The mixed liquor was subsequently centrifuged at 6,000 rpm for 5 min, the residual wet bentonite was then collected, and repeatedly washed with distilled water and centrifuged for 3 times or more, so as to ensure that each of the adsorbed NIPAM monomer was closely coupled with the bentonite layer structure. Finally, the dehydrated bentonite was further placed in a drying oven with a temperature of 80° C. and subjected to drying for 24 h to remove most of the adsorbed water, and the intercalated bentonite was further ground to 200 mesh by a powder grinder.

COMPARATIVE EXAMPLE 2

A self-locking thermally responsive bentonite film-forming agent (GB-bent) was used, labeled as the formed-film 2#, wherein the film-forming agent (GB-bent) did not use a layering technology, its preparation included the following steps:

1) 5 g bentonite was blended with 200 mL distilled water at room temperature (20° C.) and subjected to magnetic stirring for 24 h, such that the natural bentonite was sufficiently hydrated, and the interlayer spacing was expanded, in order to facilitate the subsequent insertion and grafting modification of a modifying agent.

2) 20 mL of an aqueous solution of 3-aminopropyltrimethoxysilane was dropwise added under the condition of a constant temperature of 50° C., a concentration of the aqueous solution of the 3-aminopropyltrimethoxysilane was 5.0% (v/v), the mixture was sufficiently stirred for 24 h to impart a cardinal plane of bentonite with an active primary amine group.

3) So far, the preliminary modification of bentonite was completed. The mixture was then centrifuged using a centrifuge at a rotational speed of 5,000 rpm for 5 min, the bentonite at the bottom was carefully taken out, and was repeatedly washed with methanol and centrifuged for 3 times or more. Finally, the bentonite was subjected to drying with a vacuum dryer at a temperature of 85° C. for 12 h, so as to obtain an active Bent-$NH_2$.

4) Subjecting the Bent-$NH_2$ to a functional modification, 50 mL of dried trichromethane solution (containing 2 mL of an initiator 2-bromoisobutyrylbromide) was slowly introduced under a premise of the protection with nitrogen gas, the mixture was stirred slowly at 30° C. 10 mL of 2,2'-bipyridine complexing solution (containing 0.1 mg of cuprous bromide) and 10 mL of p-xylene solution (containing 1 g of benzyl methacrylate) were subsequently introduced. Finally, the temperature was gradually raised to 90° C., and 0.2 g of N,N,N',N'',N''-pentamethyl-diethylene-triamine crosslinker was then added.

5) The condensation and reflux were maintained, the free reaction under a constant temperature was performed for 6 h. Finally, a mixed liquor of trichloromethane and methanol was used for washing the centrifuged reaction liquid for 3 times or more, nitrogen gas was introduced, and subjected to drying at 105° C. for 12 h, the product was sealed in a pot for storage to facilitate the subsequent characterization and experiments.

COMPARATIVE EXAMPLE 3

The formate drilling fluid, the ingredients and contents of the formate drilling fluid comprised: clean water+0.15%

NaOH+2% sulfonated asphalt+2% $CaCO_3$+HCOOK (potassium formate) (potassium formate was added to increase weight to 1.15 $g/cm^3$).

COMPARATIVE EXAMPLE 4

A polymeric alcohol drilling fluid, the ingredients and contents of the polymeric alcohol drilling fluid comprised: (1.5%) bentonite+(0.15%) KPAM+(1.5%) LS-2+(2.5%) phenolic resin JD-6+(3.5%) cationic emulsified asphalt SEB+(9%) potassium formate+(3.5%) polymeric alcohol MSJ+(3%) water-based lubricant FK-10.

COMPARATIVE EXAMPLE 5

There was high-temperature resistance high performance anti-collapse HIBTEC™ water-based drilling fluid in foreign country, its ingredients and contents comprised: 2% polymeric ammonium salt+1% polymeric polyol+1.5% modified asphalt+1.2% water-based lubricant.

TEST EXAMPLE 1

The film-forming drilling fluid system with different anti-collapse properties was constructed by using the film-forming agent (CB-bent) prepared in Comparative Example 1, the film-forming agent (GB-bent) prepared in Comparative Example 2, and the nanometer self-locking thermally responsive bentonite film-forming agent (Nano-GB-bent) prepared in Examples 1-5 as the anti-collapse treating agents, respectively, so as to deal with the shale formation which is prone to hydrate and collapse under the different temperatures, and the basic performance of the drilling fluid system, protective reservoir stratum performance, inhibitive performance, temperature resistance and salt resistance properties were evaluated.

The basic formulation of a thermally responsive film-forming water-based drilling fluid was shown in Table 1 below.

TABLE 1

| Items | Formulation |
| --- | --- |
| Comparative Example 1 | 3.0% CB-bent + 0.2% KPS + 1.0% SL-2 |
| Comparative Example 2 | 3.0% GB-bent + 1.0% SL-2 |
| S1 | 3.0% Nano-GB-bent-S1 + 1.0% SL-2 |
| S2 | 3.0% Nano-GB-bent-S2 + 1.0% SL-2 |
| S3 | 3.0% Nano-GB-bent-S3 + 1.0% SL-2 |
| S4 | 3.0% Nano-GB-bent-S4 + 1.0% SL-2 |
| S5 | 3.0% Nano-GB-bent-S5 + 1.0% SL-2 |
| Comparative Example 1 | 3.0% CB-bent + 0.2% KPS + 1.0% SL-2 + 1.0% PAC143 + barite |
| Comparative Example 2 | 3.0% GB-bent + 1.0% SL-2 + 1.0% PAC143 + barite |
| S1 | 3.0% Nano-GB-bent-S1+ 1.0% SL-2 + 1.0% PAC143 + barite |
| S2 | 3.0% Nano-GB-bent-S2 + 1.0% SL-2 + 1.0% PAC143 + barite |
| S3 | 3.0% Nano-GB-bent-S3 + 1.0% SL-2 + 1.0% PAC143 + barite |
| S4 | 3.0% Nano-GB-bent-S4 + 1.0% SL-2 + 1.0% PAC143 + barite |
| S5 | 3.0% Nano-GB-bent-S5 + 1.0% SL-2 + 1.0% PAC143 + barite |

The additive SL-2 was a petroleum grade filtrate reducer supplied by the Hebei Yanxing Chemical Co., Ltd., and was produced by multicomponent benzyl polymerization of various propylene and vinyl monomers; PAC143 (vinyl-based multi-element copolymer) was a tackifier supplied by the Shaha (Tianjin) Petroleum Technology Service Company; the mesh number of barite was 1,250, purchased from a Lingshou County Fengju Mineral Products Processing Plant.

The basic properties of the drilling fluids described above were shown in Table 2 below.

TABLE 2

| Items | $\rho$ (g·$cm^{-3}$) | $\mu_a$ (mPa·s) | $\mu_p$ (mPa·s) | $\tau_o$(Pa) | $V_F$ (mL) | $V_{HTHP}$ (mL) |
| --- | --- | --- | --- | --- | --- | --- |
| Comparative Example 1 | 1.04 | 35 | 21 | 14.0 | 5.6 | 9.2 |
| Comparative Example 2 | 1.06 | 38 | 23 | 15.1 | 4.7 | 3.2 |
| S1 | 1.06 | 37 | 22 | 14.9 | 4.4 | 2.6 |
| S2 | 1.08 | 38 | 23 | 15.3 | 4.4 | 2.4 |
| S3 | 1.08 | 39 | 23 | 15.4 | 4.0 | 2.2 |
| S4 | 1.08 | 40 | 24 | 15.4 | 3.8 | 2.1 |
| S5 | 1.08 | 40 | 24 | 15.5 | 3.6 | 2.0 |
| Comparative Example 1 | 2.00 | 72 | 43 | 28.9 | 6.2 | 11.3 |
| Comparative Example 2 | 2.00 | 76 | 46 | 30.2 | 5.3 | 4.5 |
| S1 | 2.00 | 75 | 45 | 30.0 | 5.1 | 3.7 |
| S2 | 2.00 | 78 | 47 | 30.3 | 4.8 | 3.5 |
| S3 | 2.00 | 78 | 47 | 30.4 | 4.7 | 3.3 |
| S4 | 2.00 | 79 | 48 | 30.4 | 4.5 | 3.1 |
| S5 | 2.00 | 79 | 49 | 30.5 | 4.3 | 3.0 |
| Comparative Example 3 | 1.15 | 40 | 24 | 14.5 | 5.1 | 6.7 |
| Comparative Example 4 | 1.21 | 45 | 27 | 14.8 | 5.0 | 6.3 |
| Comparative Example 5 | 1.17 | 41 | 21 | 14.6 | 4.9 | 6.1 |

(In the Table, the parameters $\rho$, $\mu_a$, $\mu_p$, $\tau_o$ denoted density, apparent viscosity, plastic viscosity and yield pressure, respectively; $V_F$ denoted the API filtrate loss at room temperature (20° C.) for drilling fluids, and $V_{HTHP}$ denoted the filtrate loss of the drilling fluid at 180° C.).

Experimental results demonstrated that each of the prepared low-density or high-density water-based film-forming drilling fluids exhibited desirable rheological property and low filtrate loss, but the filtrate loss of the high-density drilling fluid system was slightly increased. In particular, the high-temperature and high-pressure filtrate loss of the low-density or high-density thermally-responsive self-locking drilling fluids was less than 5 mL, indicating that the thermally-responsive self-blocking bentonite drilling fluids had stronger applicability under the high temperature.

TEST EXAMPLE 2

Evaluation of the inhibition properties of a thermally responsive film-forming drilling fluid.

Figure 11:
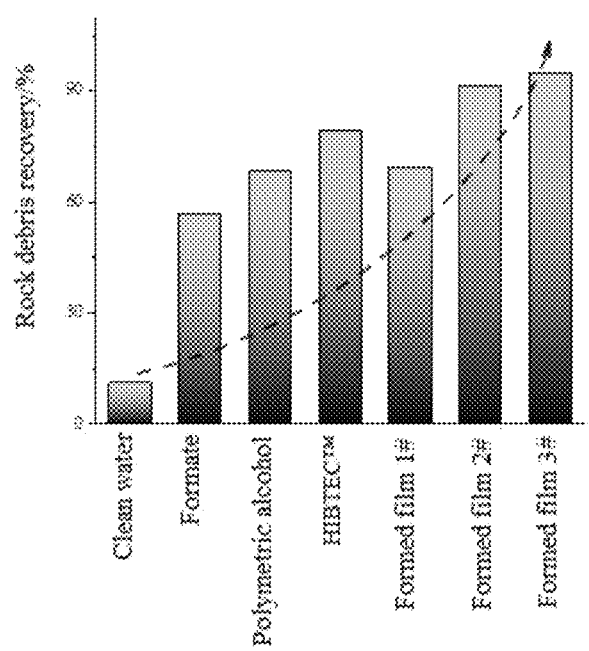
FIG. 11 shows a comparison of the inhibitive properties of a thermally responsive film-forming drilling fluid system.

FIG. 11 showed the experimental results of drill cuttings recovery rate of shale cuttings from H5-1 well at underground 2,500-2,800 meters after hot rolling in several drilling fluid systems at 180° C. for 16 h.

Experimental results demonstrated that the thermal response bentonite film-forming drilling fluid system had stronger capabilities of suppressing the hydration, swelling and dispersion of shale rock debris than the properties of the formate drilling fluids and polymeric alcohol drilling fluids commonly used in oil fields.

However, compared to the high-temperature resistance high performance anti-collapse HIBTEC™ water-based drilling fluid in foreign country, the anti-collapse inhibitive property of the 1# thermally responsive bentonite film-forming drilling fluid prepared in Comparative Example 1 was weaker, indicating that the high temperature stability of the intercalated bentonite was inferior. However, the shale rolling recovery rates of both the 2# thermally responsive film-forming water-based drilling fluid prepared in Comparative Example 2 and the 3# thermally responsive film-forming water-based drilling fluid prepared in Example 1 were higher than 90%, which was superior to the anti-collapse performance of the high performance anti-collapse HIBTEC™ water-based drilling fluid in foreign country; and the 3# thermally responsive film-forming water-based drilling fluid prepared in Example 1 had superior performance to the 2# drilling fluid prepared in Comparative Example 2, and exhibited desired engineering application prospect.

TEST EXAMPLE 3

Evaluation of the temperature resistance properties of film-forming drilling fluids.

Figure 12:
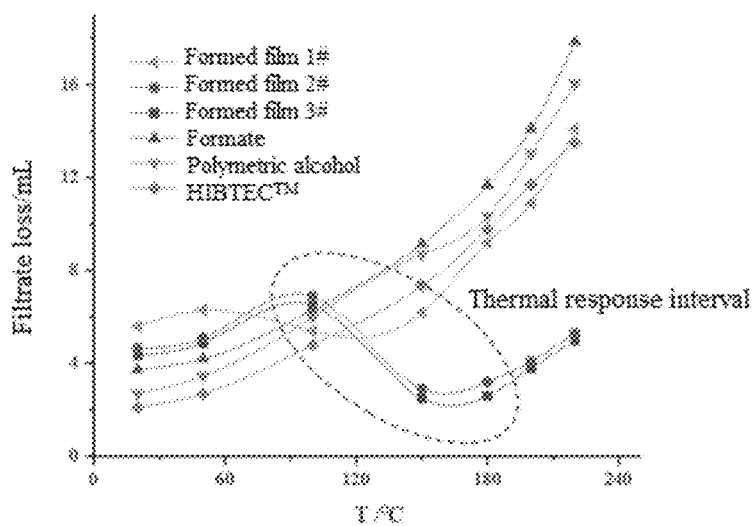
FIG. 12 is a graph illustrating a change curve of filtrate loss for high-temperature and high-pressure drilling fluids.

FIG. 12 illustrated an analytical curve of filtrate loss as a function of temperature change for film-forming drilling fluids under various temperatures.

Experimental results showed that as compared with the high performance anti-collapse drilling fluids commonly used in domestic oil fields, the thermally responsive bentonite film-forming drilling fluid system had desirable high temperature resistance, high temperature anti-collapse properties to resist a high temperature up to 180° C. Formed film 1# drilling fluid had a high temperature response temperature interval of 100-150° C., its high temperature resistance property was stronger than the conventional formate drilling fluids and polymeric alcohol drilling fluids, and formed film 2# and 3# drilling fluids had a high temperature response temperature interval of 150-200° C., their high temperature resistance properties were superior to the high-temperature resistance high performance anti-collapse HIBTEC™ water-based drilling fluid in foreign country.

TEST EXAMPLE 4

Evaluation of salt resistance properties of film-forming drilling fluids.

Figure 13:
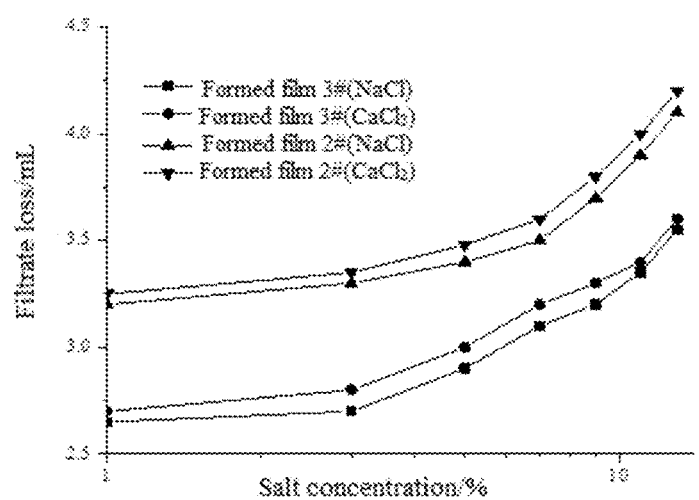
FIG. 13 is a graph illustrating a change curve of high temperature filtrate loss for the thermally responsive film-forming drilling fluid after salt contamination.

FIG. 13 illustrated the curves of high temperature and high pressure filtrate loss of formed film 2# and 3# as a function of salt concentration under the condition of high temperatures 180° C. Experimental results indicated that the variation amplitude of the high temperature filtrate loss was not great along with the increased concentration of salt, it demonstrated that the thermally responsive film-forming drilling fluid system had a strong salt contamination resistance.

TEST EXAMPLE 5

Evaluation of anti-fouling properties of the film-forming drilling fluids.

Various amounts of drill cuttings powder were added separately to the film-forming drilling fluids, stirred at high rotational speed for 20 min, hot-rolled at 180° C. for 16 h, the normal temperature properties of drilling fluids before and after the hot-rolling were measured. The experimental results were shown in Table 3 below.

TABLE 3

| | | Before the hot rolling | | | | After the hot rolling | | | |
|---|---|---|---|---|---|---|---|---|---|
| ID | Drilling cuttings | AV (mPa · s) | PV (mPa · s) | YP(Pa) | FL(mL) | AV (mPa · s) | PV (mPa · s) | YP(Pa) | FL(mL) |
| 1 | 0 | 38 | 23 | 15 | 4.4 | 41 | 24 | 17 | 2.7 |
| 2 | 5 | 38 | 24 | 14 | 5.0 | 43 | 22 | 21 | 3.0 |
| 3 | 10 | 39 | 25 | 14 | 5.4 | 43 | 21 | 22 | 3.2 |
| 4 | 15 | 39 | 26 | 13 | 5.6 | 43 | 20 | 23 | 3.3 |

Note: Sequence numbers 1-4 in ID corresponded to film-forming drilling fluids, respectively, except that the added amount of rock debris was different, wherein the film-forming drilling fluid referred to S2 in Table 2.

Experimental results demonstrated that although the added amount of the drilling cuttings was increased, the performance of the drilling fluid was stable without significant change, indicating that the drilling fluid had desirable anti-fouling performance.

TEST EXAMPLE 6

Evaluation of the long term effectiveness of film-forming drilling fluids.

Figure 14:
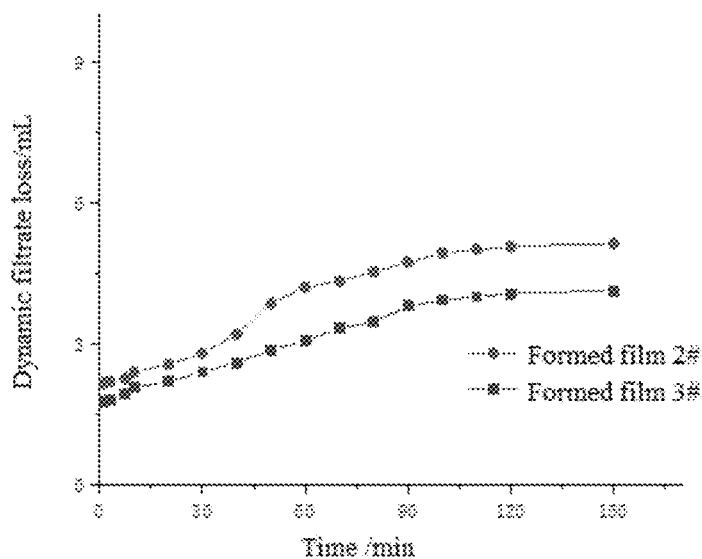
FIG. 14 is a chart showing a relationship between the dynamic filtrate loss versus time for the thermally responsive film-forming drilling fluids.

FIG. 14 was a chart illustrating a variation curve of the measured dynamic filtrate loss versus time.

According to the practical results, if the well drilling filtrate loss did not change along with changes in the drilling time, the drilling fluid had strong film-forming long-lasting performance, and produced the strong effect of preventing collapse of shale collapse and protecting the reservoir stratum. The aforesaid experimental results indicated that the initial filtrate loss of the thermally responsive film-forming drilling fluid would grow along with an increased drilling time, but the total filtrate loss was still less than 10 mL, and the increment of the high temperature and high pressure dynamic filtrate loss variable over time was verged to zero after 120 min, indicated that the film-forming drilling fluid system had desired effects of preventing collapse of shale and protecting the reservoir stratum.

TEST EXAMPLE 7

Tests of permeability recovery value of the film-forming drilling fluids.

The shale from an oil well reservoir stratum of South Sichuan Oil Field was used as a rock core gasket, to simulate the damage of in situ drilling fluid to the reservoir stratum throughout the whole course using dynamic evaluation, taking into account the practical engineering conditions (test temperature 180° C., damage pressure differential 3.51 MPa, damage velocity delivery 108 $s^{-1}$), permeability recovery values for the rock core after damaged by the thermally responsive film-forming drilling fluid were measured, the experimental results were shown in Table 4 below.

TABLE 4

| Rock core No. | Film-forming drilling fluids | Permeability prior to damage ($10^{-3}\mu m^2$) | Permeability after damage ($10^{-3}\mu m^2$) | Permeability recovery value (%) | Experimental conditions |
|---|---|---|---|---|---|
| 1-1 | Formed film 3# | 214.04 | 201.95 | 94.35 | Temperature 180° C. Pressure difference 3.5 MPa |
| 1-2 | Formed film 3# | 209.28 | 198.05 | 94.63 | Temperature 180° C. Pressure difference 3.5 MPa |
| 1-3 | Formed film 3# | 211.62 | 196.92 | 93.05 | Temperature 180° C. Pressure difference 3.5 MPa |
| 1-4 | Formed film 2# | 207.93 | 189.84 | 91.30 | Temperature 180° C. Pressure difference 3.5 MPa |
| 1-5 | Formed film 2# | 211.17 | 191.01 | 90.45 | Temperature 180° C. Pressure difference 3.5 MPa |
| 1-6 | Formed film 2# | 215.40 | 192.05 | 89.26 | Temperature 180° C. Pressure difference 3.5 MPa |

Tests showed that the formed films of the thermally responsive bentonite film-forming drilling fluids caused small damage to the reservoir stratum, the systems were conducive to protecting the reservoir stratum. In particular, the permeability recovery values of the rock core gasket after being damaged by the formed film 3# drilling fluid were larger than 93%, the permeability recovery values of the rock core gasket after being damaged by the formed film 2# drilling fluid were smaller, it indicated that the formed film 3# drilling fluid not only exhibited high temperature collapse resistance, but also effectively alleviated damage of the drilling fluid to the shale having middle and low permeability.

TEST EXAMPLE 8

Researches on toxicity and fluorescence performance of the thermally responsive film-forming drilling fluids.

Figure 15:
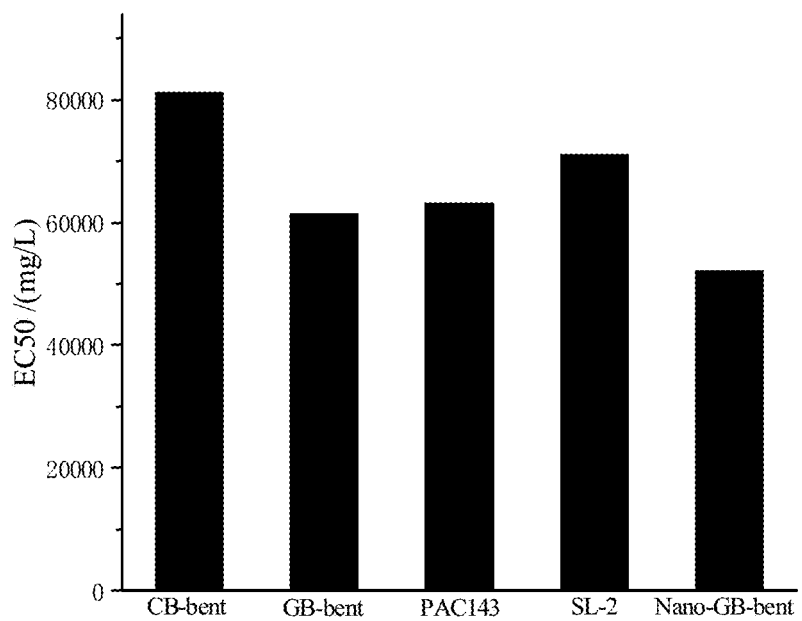
FIG. 15 is a plot shows a biotoxicity analysis of the thermally responsive film-forming drilling fluids.

Several treating agents in the thermally responsive bentonite film-forming drilling fluid were subjected to the toxicity evaluation by using the SY-1 biotoxicity tester, and the biotoxicity was measured by the photogenic bacterium method, as shown in FIG. 15.

The test results of biotoxicity parameter EC50 (mg/L) for CB-bent, GB-bent, Nano-GB-bent, SL-2, PAC143 were >80,000, >60,000, >50,000, >70,000, >60,000, respectively, each of them exhibited non-toxicity, each of the thermally responsive film-forming drilling fluids composed of the treating agents was greater than 20,000, which satisfied the proposed discharge standards. In addition, fluorescence was not detected for several treating agents, which facilitated geological logging and well logging.

TEST EXAMPLE 9

Figure 16:
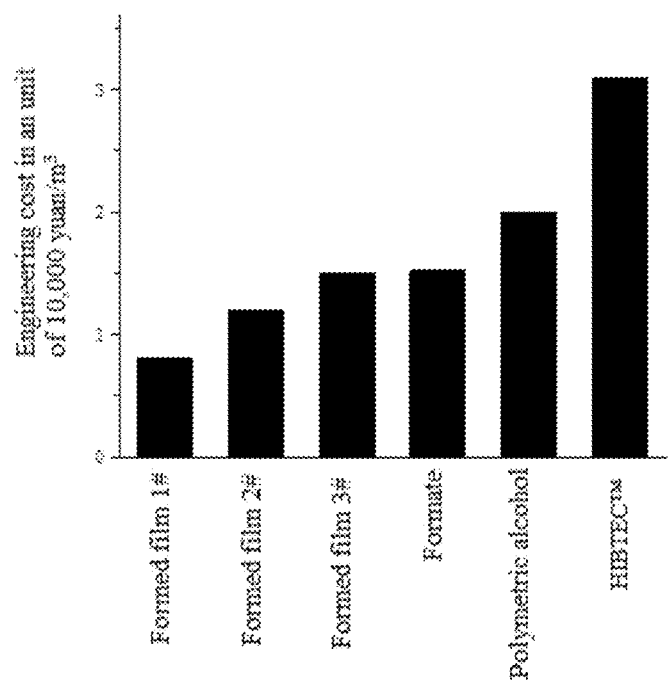
FIG. 16 is a graph comparing the cost of thermally responsive film-forming drilling fluids.

As shown in FIG. 16, when taken into consideration of the matching ratio, material cost, processing expense, equipment cost, traffic expense and the like, the engineering costs of the thermally responsive bentonite film-forming drilling fluid #1, the thermally responsive bentonite film-forming drilling fluid #2 and the thermally responsive bentonite film-forming drilling fluid 3# were 8,000 yuan/$m^3$, 13,000 yuan/$m^3$, and 15,000 yuan/$m^3$, respectively. While the cost of the high performance formate anti-collapse drilling fluid supplied by the Oil Field was 18,000 yuan/$m^3$ and 21,000 yuan/m³, respectively, the cost of drilling fluid HIBTEC™ supplied by the Shark Oil Petroleum Technology Service Company in the United States of America (USA) was higher than 30,000 yuan/m³, which was about twice the cost of the thermally responsive film-forming drilling fluids.

Based on the above research results, the thermally responsive film-forming drilling fluids not only offer enhanced collapse resistance, and have simple formulation and lower engineering costs, thus the drilling fluids are suitable for drilling the high temperature shale formations which are prone to suffer from water loss, and exhibit desirable prospect for engineering applications.

The above content describes in detail the preferred embodiments of the present disclosure, but the present disclosure is not limited thereto. A variety of simple modifications can be made in regard to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:

1. A method for preparing a nanometer self-locking bentonite film-forming agent comprising:
   (1) subjecting a nano-bentonite to a first contact with an acid to perform a chemical slicing, so as to obtain a sliced nano-bentonite;
   (2) initially subjecting the sliced nano-bentonite to a second contact with an aqueous sodium chloride solution, then subjecting to a third contact with a long-chain macro-molecular polymer material, so as to obtain a low-dimensional nanometer self-locking bentonite;
   (3) blending the low-dimensional nanometer self-locking bentonite, the nano-bentonite and water, the dropwise adding a structural bonding agent to activate a layer structure surface of the low-dimensional nanometer self-locking bentonite;
   (4) introducing trichromethane solution, 2,2'-bipyridine complexing solution, p-xylene solution into the product obtained after step (3) under the protection of nitrogen gas, subsequently adding a N,N,N',N'',N''-pentamethyl-diethylene-triamine crosslinker for carrying out a free reaction under a constant temperature, so as to germinate the layer structure surface of the low-dimensional nanometer self-locking bentonite;
   (5) subjecting a reaction solution after step (4) to a washing, centrifugation and drying treatment by using a mixed liquor of trichloromethane and methanol, thereby prepare a nanometer self-locking bentonite film-forming agent.

2. The method of claim 1, wherein the chemical slicing in step (1) comprises a standing time of 6-24 h after dispersing under the condition of a temperature 20-60° C.

3. The method of claim 1, wherein the long-chain polymeric material in step (2) is one or more selected from the group consisting of octadecyl trimethyl ammonium chloride, cationic polyacrylamide, and polyethyleneimine;
   wherein the long-chain polymeric material is used in an amount of 0.1-4 g relative to 100 mL of the acid.

4. The method of claim 1, wherein the second contact condition comprises a temperature of 20-50° C. and a time of 8-15 h;
   wherein the third contact condition comprises a temperature of 30-60° C. and a time of 2-6 h.

5. The method of any one of the claim 1, wherein the method further comprises: prior to step (1), subjecting the nano-bentonite to a pulverization and dispersion treatment to obtain a clay;
   wherein the clay is used in an amount of 1-15 g, relative to 100 mL of the acid.

6. The method of any one of the claim 5, wherein the clay is used in an amount of 3-12 g, relative to 100 mL of the acid.

7. The method of claim 1, wherein in step (3), the low-dimensional nanometer self-locking bentonite is used in an amount of 0.1-2 g, the nano-bentonite is used in an amount of 0.1-2 g, and the structural bonding agent is used in an amount of 0.1-6 mL, with respect to 200 mL of water.

8. The method of claim 1, wherein the structural bonding agent is 3-aminopropyltrimethoxysilane.

9. The method of claim 1, wherein the activation condition comprises a temperature of 40-60° C. and a time of 6-30 h.

10. The method of claim 1, wherein in step (4), the trichloromethane solution is used in an amount of 1-3 mL, the 2,2'-bipyridine complexing solution is used in an amount of 0.2-6 mL, the N,N,N',N'',N''-pentamethyl-diethylene-triamine crosslinker is used in an amount of 2-6 mg, relative to 10 mL of p-xylene solution.

11. The method of claim 1, wherein the germination conditions comprise a temperature of 60-90° C. and a time of 6-12 h.

* * * * *